Jan. 27, 1953  J. R. PIERCE  2,626,990
GUIDED WAVE FREQUENCY RANGE TRANSDUCER
Filed May 4, 1948  10 Sheets-Sheet 1

INVENTOR
J. R. PIERCE
BY
H. O. Wright
ATTORNEY

INVENTOR
*J. R. PIERCE*
BY
*H. O. Wright*
ATTORNEY

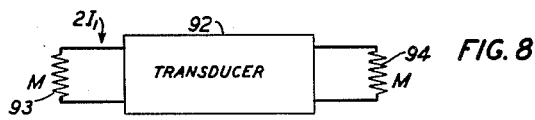
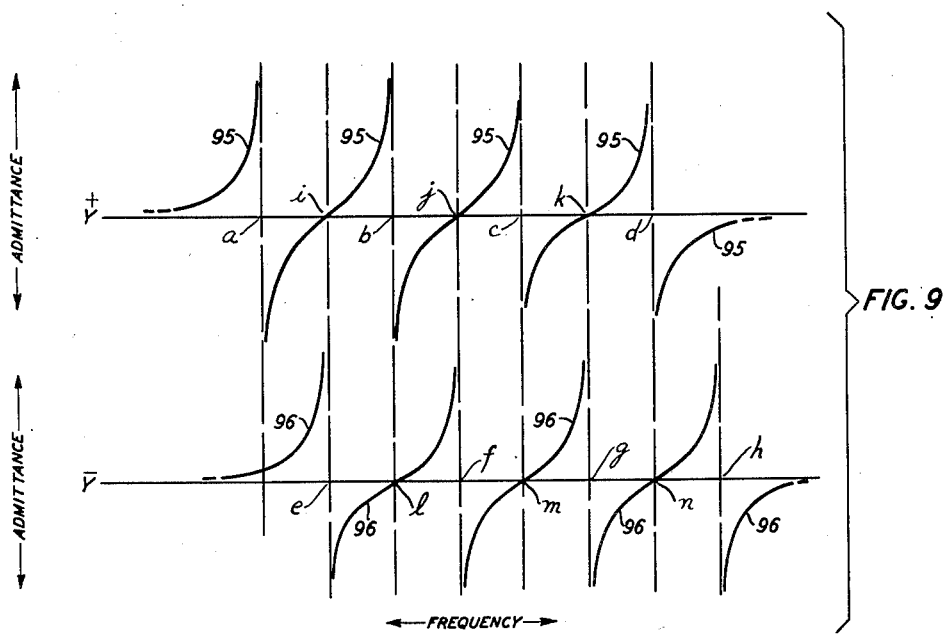
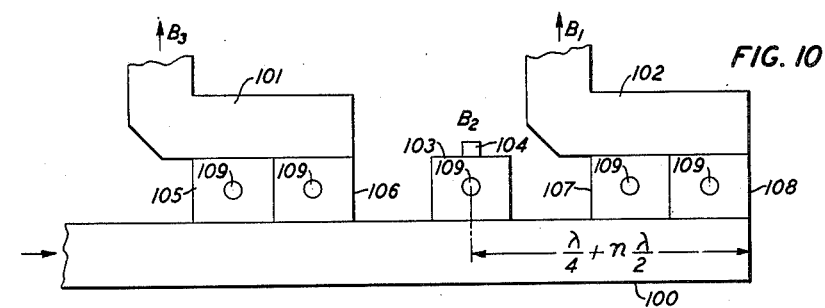
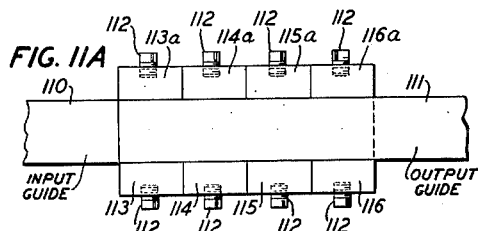
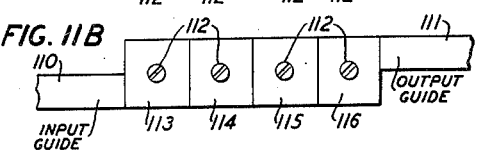
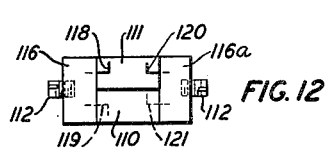

Jan. 27, 1953    J. R. PIERCE    2,626,990
GUIDED WAVE FREQUENCY RANGE TRANSDUCER
Filed May 4, 1948    10 Sheets-Sheet 4

INVENTOR
J. R. PIERCE
BY
H. O. Wright
ATTORNEY

Jan. 27, 1953   J. R. PIERCE   2,626,990
GUIDED WAVE FREQUENCY RANGE TRANSDUCER
Filed May 4, 1948   10 Sheets-Sheet 5

INVENTOR
J. R. PIERCE
BY H. O. Wright
ATTORNEY

Jan. 27, 1953　　　　J. R. PIERCE　　　　2,626,990
GUIDED WAVE FREQUENCY RANGE TRANSDUCER
Filed May 4, 1948　　　　　　　　　　　　　　10 Sheets-Sheet 6
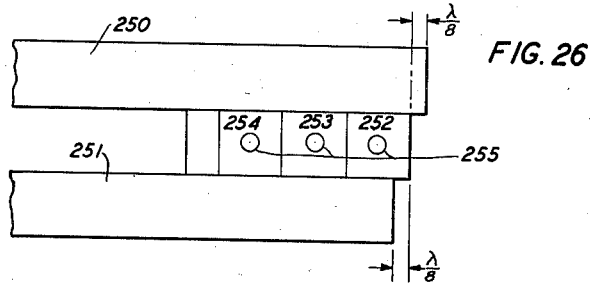
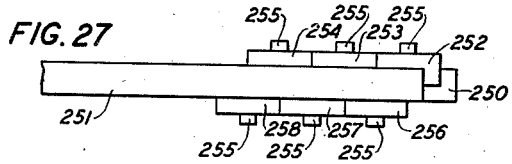
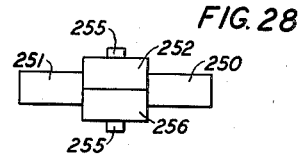
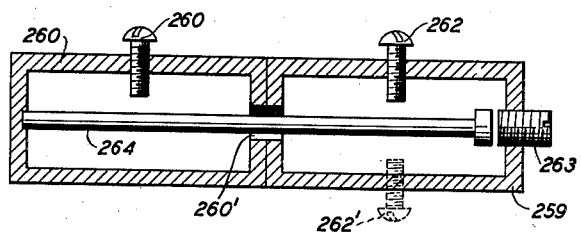
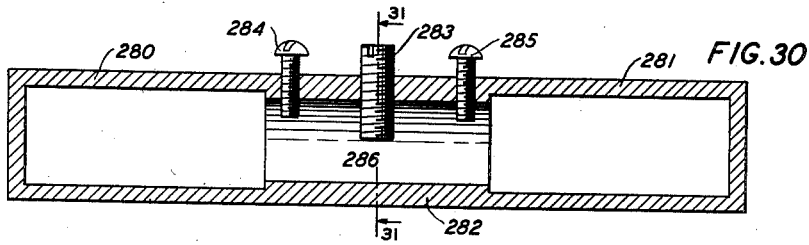
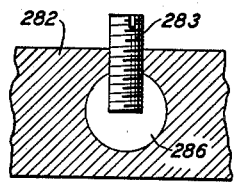
*INVENTOR*
*J. R. PIERCE*
BY
*H. O. Wright*
ATTORNEY Jan. 27, 1953         J. R. PIERCE         2,626,990
GUIDED WAVE FREQUENCY RANGE TRANSDUCER
Filed May 4, 1948         10 Sheets-Sheet 7

INVENTOR
*J. R. PIERCE*
BY
*H. O. Wright*
ATTORNEY

Jan. 27, 1953        J. R. PIERCE        2,626,990

GUIDED WAVE FREQUENCY RANGE TRANSDUCER

Filed May 4, 1948        10 Sheets-Sheet 8

INVENTOR
*J. R. PIERCE*
BY
*H. O. Wright*
ATTORNEY

Jan. 27, 1953        J. R. PIERCE        2,626,990

GUIDED WAVE FREQUENCY RANGE TRANSDUCER

Filed May 4, 1948        10 Sheets-Sheet 9

INVENTOR
J. R. PIERCE
BY
H. O. Wright
ATTORNEY

Jan. 27, 1953  J. R. PIERCE  2,626,990
GUIDED WAVE FREQUENCY RANGE TRANSDUCER
Filed May 4, 1948  10 Sheets-Sheet 10

INVENTOR
J. R. PIERCE
BY
H. O. Wright
ATTORNEY

Patented Jan. 27, 1953

2,626,990

UNITED STATES PATENT OFFICE 2,626,990

GUIDED WAVE FREQUENCY RANGE TRANSDUCER

John R. Pierce, Millburn, N. J., assignor to Bell Telephone Laboratories, Incorporated, New York, N. Y., a corporation of New York Application May 4, 1948, Serial No. 25,027

41 Claims. (Cl. 178—44)

This invention relates to novel structures adapted primarily for use at very high, ultra-high and super-high frequencies, i. e., at frequencies within the approximate ranges of 30 to 300 megacycles; 300 to 3,000 megacycles and 3,000 megacycles and above, respectively; as frequency selective or phase and/or amplitude equalizing devices.

Since, with frequencies within the above-mentioned frequency regions, wave guide and/or coaxial line structures are usually employed for transmission purposes, and the coaxial line is, in a sense, a special form of "wave guide," we shall, throughout this application and the appended claims, refer to the over-all frequency range of interest, i. e., frequencies of approximately 30 megacycles and above, as the "guided wave frequency range."

In general, because at least one cross-sectional dimension of a wave guide of the single tubular conductor type should be approximately one half a wavelength, or more, of the lowest frequency to be transmitted through it, wave guides of this type are, as a practical matter, usually employed only at frequencies sufficiently high that the maximum cross-sectional wave guide dimension required is not greater than about 3 inches. This virtually means that, as a practical matter, wave guide structures will usually be employed only when the lowest frequency to be transmitted is not less than about 2,000 megacycles, corresponding to about 15 centimeters wavelength. Much larger wave guides, and correspondingly lower frequency operation can, of course, be employed if only relatively short wave guides are required or if other considerations outweigh the cost of the larger size of wave guide. At lower frequencies than 2,000 megacycles coaxial structures will, however, ordinarily be used. Coaxial structures can, of course, be used at frequencies of several times 2,000 megacycles so that there is an appreciable frequency range within which either coaxial or wave guide structures or combinations of the two types can be employed.

For a discussion of wave guides of the single conductor type, reference may be had to the "Radio Engineer's Handbook" by F. E. Terman, pages 251 to 264, published in 1943 by McGraw-Hill Book Co., Inc., New York city. Unless otherwise specified the term "wave guide" will be used throughout this specification and the appended claims to denote structures of the type described by Terman. In general, the "resonators," employed in the numerous structures illustrative of the present invention, as shown in the accompanying drawings and described in detail below, are known to those skilled in the art as "cavity resonators." For example, for a discussion of "cavity resonators," see pages 143 to 148, inclusive, of F. E. Terman's book entitled "Radio Engineering," published in 1947 by McGraw-Hill Book Co. Inc., New York city.

More particularly this invention relates to novel structures which can be employed in the "guided wave frequency range" to provide characteristics closely approximating those of the so-called "lumped-element" lower frequency devices, commonly designated as wave filters or phase, and/or amplitude, equalizing networks, at voice and the lower carrier telephone frequency ranges.

For the "lumped-element" low frequency devices and for "guided wave frequency range" wave filter and equalizing devices, it has heretofore been the almost universal practice to interconnect the input and output circuits from which and to which power is to be transferred, respectively, by a plurality of resonant circuit structures coupled in tandem, so that all portions of a signal, in passing from the input circuit to the output circuit, pass through all of the structures.

In the case of the structures of the present invention, the input and output circuits (usually wave guides or coaxial lines) are connected by each of a plurality of resonating structures or "resonators" so that each resonator acts, to some degree at least, as an independent coupling and the individual structures can thus be regarded as being in parallel relation with respect to each other in the coupling afforded by their combined action between the input and output circuits. For this reason the structures of the invention can be conveniently designated generally as "paralleled resonator transducers."

The term "transducer" for the purposes of this specification and the appended claims, shall be understood to specifically include very high, ultra-high and super-high frequency structures having characteristics similar to low frequency tuned circuits, wave filters, amplitude equalizers, phase equalizers and delay networks or delay equalizers and to mean generally any combination of structure a function of which is to transfer some portion, or all, of the energy from one circuit to another, i. e., any device of the specific or general classes named is, for the purposes of this application, a "transducer."

A first subclass of structures of the invention comprises those in which a desired transmission characteristic is achieved simply by totalizing the virtually independent contributions of a plurality of resonators. In this subclass of structure the resonant frequencies of the component resonators will lie within the frequency band transmitted by the over-all structure. This subclass of structures is the "guided wave frequency range" counterpart of the low frequency "tuned circuit" type of frequency selective network in which two or more resonant combinations of a coil and a condenser each, are combined to produce relatively simple frequency selective characteristics. Such elementary circuits are used in the low frequency art, for example, in coupling the successive stages of a vacuum tube amplifier and for similar purposes where the phase and attenuation characteristics need not rigorously meet precise and severe requirements.

Since some of the individual resonant structures can, as will become apparent hereinunder, be arranged, in any one of a number of ways, to introduce a change of phase, in transmitting energy from the input circuit to the output circuit, which differs by 180 degrees from the change of phase introduced by others of the resonant structures, a second subclass of structures of the invention can be distinguished, which second subclass includes structures having two or more resonators one portion of which resonators provides what will be designated as "direct" coupling, i. e., a coupling providing no significant phase change, and another portion of which resonators provides what will be designated as "contrary" coupling, i. e., a coupling which introduces a phase change of 180 degrees with respect to that of the first-mentioned portion, in transmitting electrical energy from the input to the output circuit. As will become apparent hereinunder, this second subclass of structures can readily be proportioned so as to closely simulate by the combined action of the "direct" and "contrary" coupled resonators at very high, ultra-high and super-high frequencies, the transmission characteristics of the well-known "lumped-element," low frequency "lattice" type of structure. In this second subclass of structure, a number of the resonators can, as in the low frequency lattice type of structure, have resonant frequencies lying outside the frequency band transmitted by the over-all structure. The significance of this will be explained in detail hereinafter.

The "lattice" type structure is, of course, recognized as the most general type of "lumped-element" electrical network. Highly developed and refined theories and design methods for appropriately proportioning the component "lumped elements" and arranging such structures to provide almost any desired transmission characteristics at lower frequencies have been available to those skilled in the art for many years. For example, see the papers entitled "A General Theory of Electric Wave Filters" by H. W. Bode, published in the Massachusetts Institute of Technology Journal of Mathematics and Physics, November 1934 and "Ideal Wave Filters" by H. W. Bode and R. L. Dietzold published in the Bell System Technical Journal, volume XIV, No. 2, April 1935 at page 215.

Broadly stated, the object of the invention is to provide novel types of very high frequency, ultra-high frequency and super-high frequency (i. e. "guided wave frequency range") transducers.

A principal object of the invention is to provide novel structures for use in "guided wave frequency range" transmission systems, which will have, in said frequency range, substantially the characteristics possessed at low frequencies by "lumped-element" electrical wave filters.

Another object is to provide novel structures for use in guided wave frequency range transmission systems, which will have, in said frequency range, substantially the characteristics, possessed at low frequencies, by "lumped-element" electrical equalizing networks.

A further object is to provide novel structures, for use at very high, ultra-high and super-high frequencies, which will closely simulate the characteristics possessed at low frequencies by "lumped-element" electrical "lattice" networks.

Other and further objects will become apparent during the course of the following description and from the appended claims.

The principles of the invention will be more readily understood from the following detailed description of specific illustrative embodiments of the invention and from the accompanying drawings in which.

Figure 13:
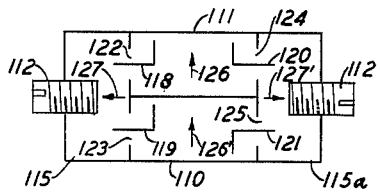
Figure 24:
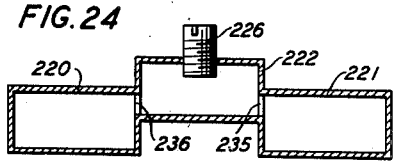
Figure 33:
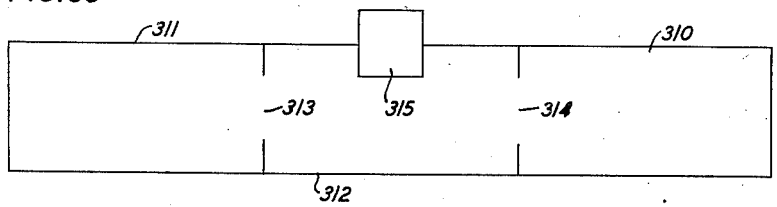
Figure 34:
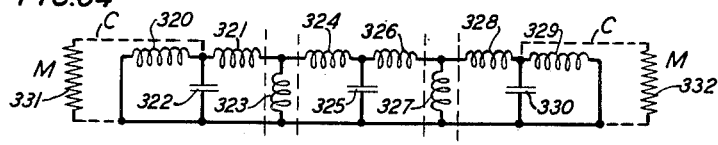
Figure 35:
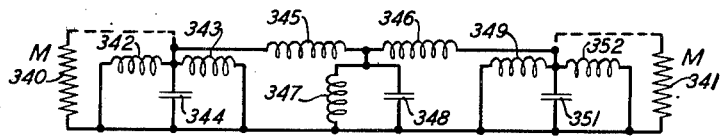
Figure 36:
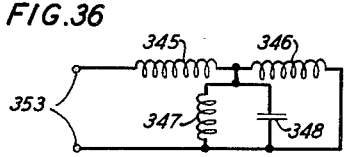
Figure 37:
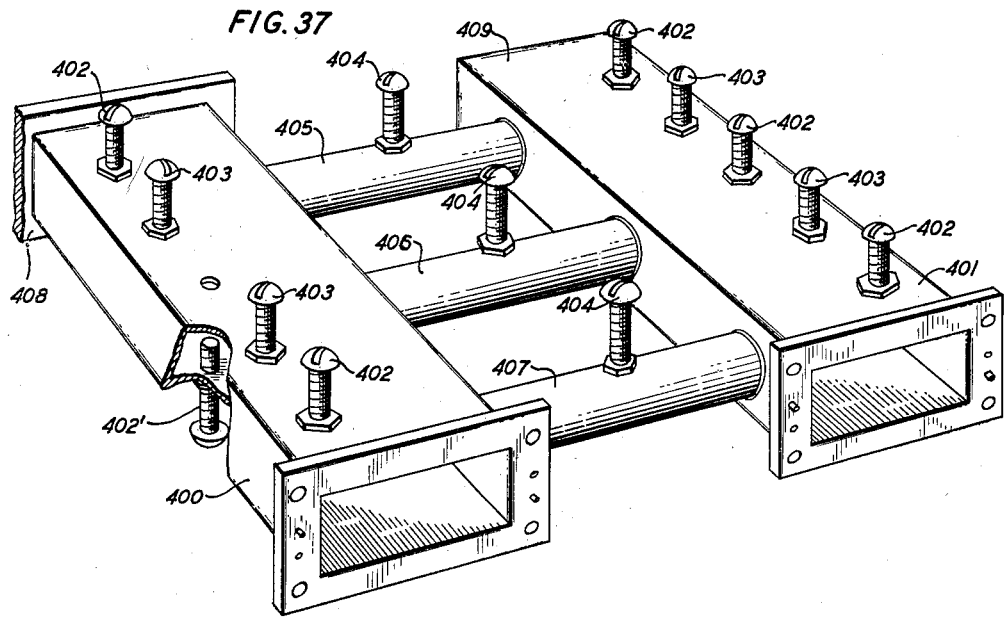
Figure 38:
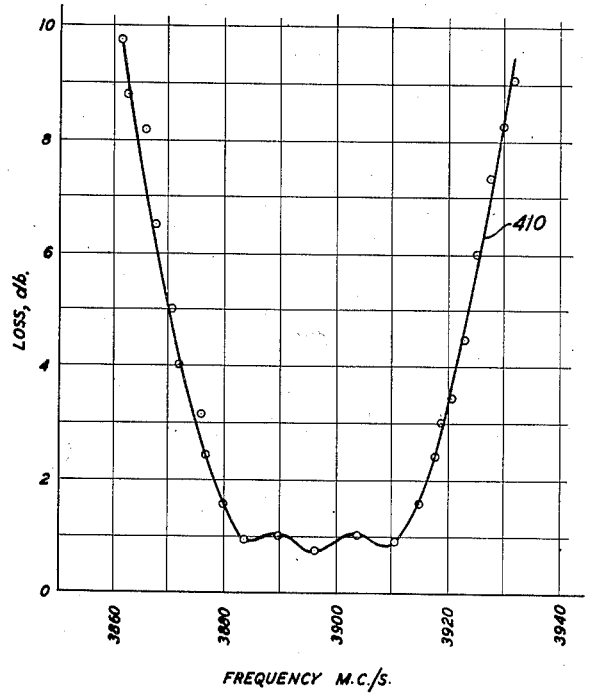
Figure 39A:
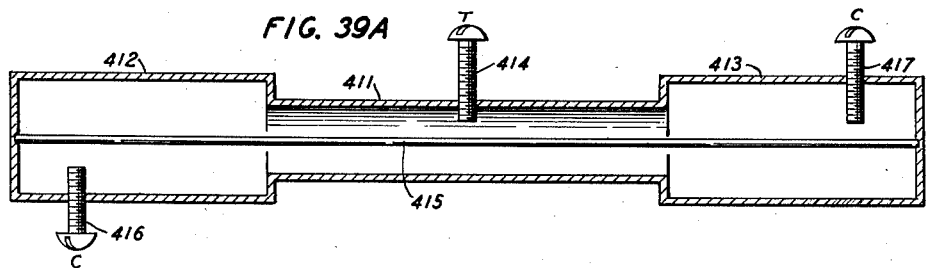
Figure 39B:
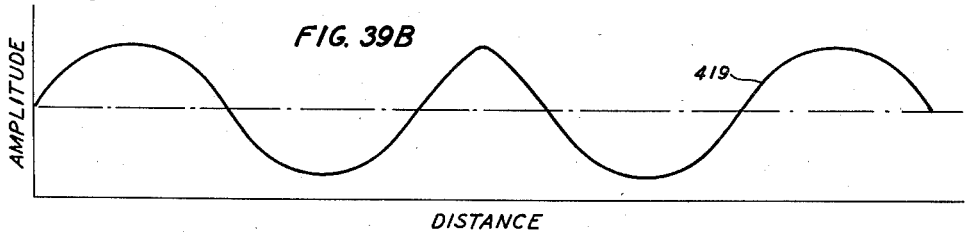
Figure 40:
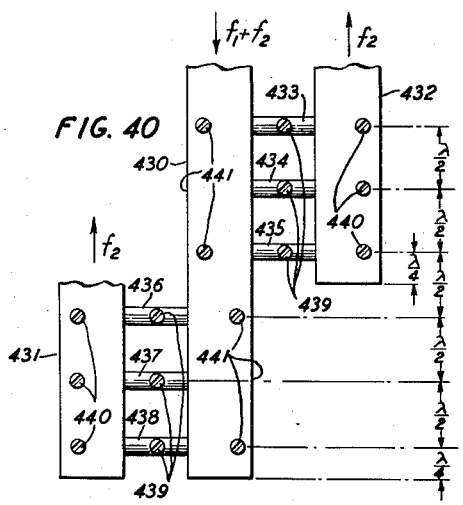
Figure 41A:
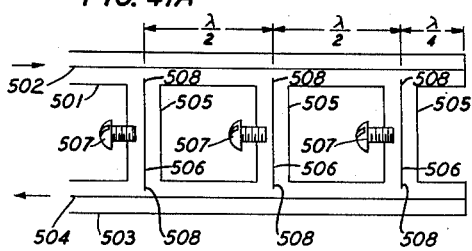
Figures 41B, 41C:
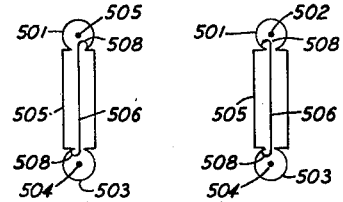
Figure 42:
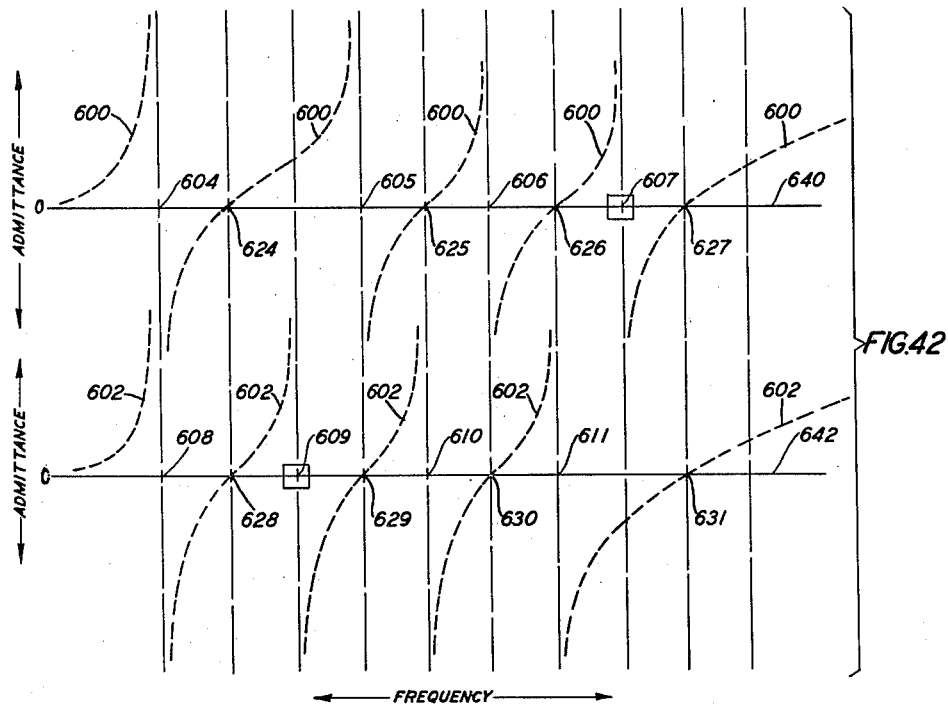
Figure 43:
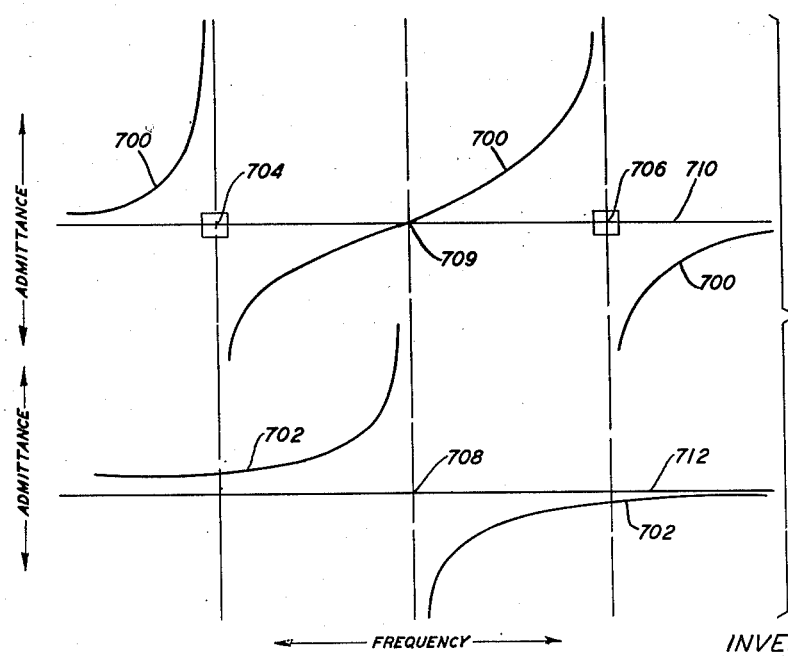

Figs. 5, 6, 7, 8 and 9, inclusive, are diagrammatic showings employed in explaining the nature and functioning of devices of the invention of the general types illustrated in Figs. 1 to 4, inclusive;

Fig. 10 shows a two-channel branching wave filter combination of the invention which includes an impedance corrective resonator arranged to improve the impedance of the structure between the frequency bands segregated by the wave filters;

Figs. 11A, 11B and 12 show top, side and end views respectively of another structure of the invention;

Fig. 13 shows a cross-sectional view through two resonators and the wave guides of the structure of Figs. 11A, 11B and 12;

Figs. 14 to 19, inclusive, show various forms of resonator and coupling arrangements which can be employed in the structures of the invention;

Figs. 20 to 23, inclusive, illustrate a further variation in structures of the invention whereby "direct" and "contrary" couplings are effected by the positioning of the resonators;

Fig. 24 shows an arrangement of the invention in which the coupling of the resonator to the wave guides is effected through irises;

Figs. 25 to 28, inclusive, illustrate structures of the invention in which the closed ends of the two wave guides coupled thereby are offset by a quarter wavelength;

Figs. 29 to 33, inclusive, illustrate alternative forms which arrangements of the invention may take;

Figs. 34 to 36 are schematic electrical circuit diagrams employed in explaining the nature and functioning of the arrangement of Fig. 33;

Fig. 37 shows an illustrative model device constructed in accordance with the principles of the invention;

Fig. 38 shows the measured frequency-versus-loss characteristic of the device of Fig. 37;

Fig. 39A shows, in cross-section, the detailed arangement of one of the resonators employed in the device of Fig. 37;

Fig. 39B is a curve of the voltage distribution along the resonator of Fig. 39A;

Fig. 40 shows a branching wave filter arrangement of the invention, employing, essentially, two devices of the type illustrated in Fig. 37, connected to a single input wave guide to separate two frequency channels or bands, and direct each band into a different one of the two output wave guides;

Figs. 41A to 41C, inclusive, show the structure of a transducer of the invention suitable for coupling two coaxial transmission lines, the transducer being useful at very high and ultra-high frequencies; and Figs. 42 and 43 are admittance diagrams employed in explaining further capabilities of transducer structures of the invention.

In view of the current interest in the so-called "microwave" radio transmission systems, in which frequencies of several thousand megacycles are commonly employed, the majority of the structures employed for illustrative purposes in this application are of types more directly suitable for use with "microwave" transmission systems. Similar or analogous structures, suitable for use at somewhat lower frequencies with coaxial lines can, however, be readily devised, by those skilled in the art, by the obvious application and adaptation of the principles of the invention to corresponding coaxial line structures. Figs. 41A to 41C, inclusive, represent in detail one such adaptation. Throughout this application and the appended claims "microwave frequencies" shall be understood to mean those frequencies which are conveniently transmitted through the hollow tube type of wave guide of practicable physical dimensions, i. e., frequencies of approximately 2,000 megacycles and higher.

Figure 1:
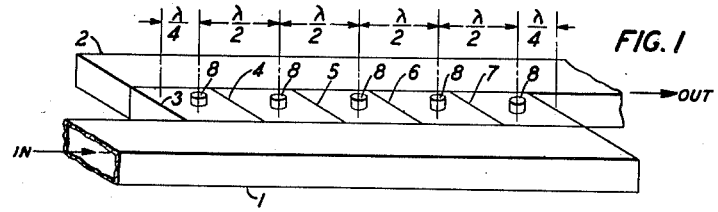
Fig. 1 shows one form of structure of the invention which can be proportioned to be an ultra-high frequency or super-high frequency, selective wave filter, or an equalizing network, of the "shunt coupling" type.

In more detail, in Fig. 1, are shown two wave guides 1 and 2, wave guide 1 being designated as the input and wave guide 2 as the output, for convenience in describing the arrangement only. The right end of wave guide 1 and the left end of wave guide 2 are closed. The functions of these guides can usually be interchanged, if desired, without appreciably changing the ultimate result, for the accomplishment of which the arrangement has been devised. The suitable proportions for wave guides to be used in transmission systems, as is well known to those skilled in the art, depend upon the frequencies to be employed. The matter is discussed above and also, in some detail, in the copending application of W. D. Lewis Serial No. 789,985, filed December 5, 1947 which matured into United States Patent 2,531,447, granted November 28, 1950.

Connecting wave guide 1 with wave guide 2 are five resonators 3 to 7, inclusive, each being provided with a tuning stub 8. The number of resonators to be used in any instance is determined by the width of the band of frequencies to be transmitted from one wave guide to the other and by the degree of uniformity of transmission desired throughout that band. The wider the frequency band and the greater the uniformity desired the larger, in general, will be the number of resonators which should be employed. In some instances the number of resonators required can be decreased by using more complex types of resonators such, for example, as those disclosed in United States Patent 2,432,093 granted December 9, 1947, to A. G. Fox.

Figure 2:
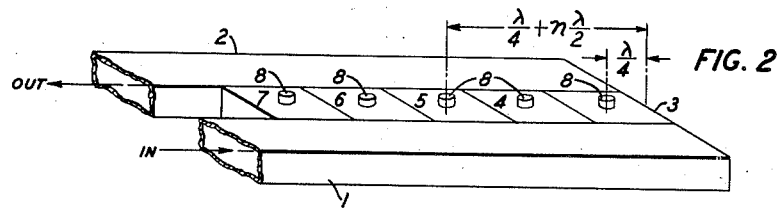
Fig. 2 shows a second form of structure of the general type shown in Fig. 1 but rearranged slightly to permit somewhat improved performance.

Five resonators 3 to 7, inclusive, are shown in Figs. 1 and 2 for illustrative purposes, but a greater or lesser number can equally well be employed depending upon factors, some of which have been mentioned above and others of which will be discussed hereinunder.

The tuning stubs 8 can preferably be threaded and the holes through which they project into their respective resonators can also preferably be threaded to fit the stub threads so that the stubs can readily be adjusted with respect to the distances to which they extend into the resonators.

Each resonator is tuned to a different resonant frequency. For structures falling within the first subclass mentioned above all the resonant frequencies will lie within the band of frequencies to be transmitted by their combined action. For structures falling within the second subclass mentioned above, some of the resonant frequencies can be located outside the band of frequencies to be transmitted. In general, the resonant frequencies of a group of resonators such as 3 to 7, inclusive, will usually be arranged so that, for example, the resonator 3 is tuned to the lowest resonant frequency, resonator 4 to the next to lowest resonant frequency, and so on, resonator 7 being tuned to the highest resonant frequency. Such an arrangement of the frequencies facilitates the straightforward tuning and adjusting of the over-all transducer structure. However, it is not essential to follow such an arrangement and in cases where objectionable interference or "cross-talk" between adjacent resonators might be encountered if their respective resonant frequencies are too close together in frequency, or are harmonically related, the difficulty can frequently be substantially reduced or eliminated by an arrangement in such order that resonators which tend to cause mutual interference are widely separated from each other.

The resonators 3 to 7, inclusive, can be substantially empty cavities enclosed by a conductive sheet of material. Alternatively, they can include, within their respective cavities, probes, or rods, or the like, arranged in conjunction with the cavity to effect resonance in many ways, well known to those skilled in the art, some illustrative forms of which will be described in detail below. The resonators can be of rectangular, circular, ovoid or of substantially any convenient cross-sectional and longitudinal conformations which will provide a cavity of suitable size to afford adjustment of its resonances over the desired range by a convenient tuning arrangement. A number of illustrative forms of resonators, suitable for use in arrangements of the invention, will be described below, in detail, in connection with other figures of the drawings. In general, the resonators should, for convenient use, in arrangements of the general type shown in Fig. 1, have at least one dimension in common so that they can conveniently be assembled adjacent to the two wave guides to be coupled. Very often the resonators can be, simply, sections of transmission line of like kind and cross-sectional dimensions with the transmission lines being coupled together by the resonators, the length of resonators then being approximately one-half wavelength of the median frequency of the band of frequencies to be transmitted.

Each resonator is coupled between the two wave guides, the point of coupling of a particular resonator to one guide being separated appreciably (usually by approximately one-half wavelength of the median frequency of the band to be transmitted) from the point of coupling the same resonator to the other guide. Numerous and varied types of suitable couplings between the individual resonators and the wave guides are also described below, for purposes of illustration, in connection with other figures of the drawings. In some instances the coupling arrangements, particularly, for example, where iris coupling arrangements are employed, can themselves introduce reactive effects which in cooperative relation with the resonance of the main cavity determine jointly the transmission characteristics of the over-all device. For example, see the above-mentioned patent of A. G. Fox in which resonant irises, many forms of which are well known to those skilled in the art, used as coupling means, cooperate with resonant cavities in determining the transmitting characteristics of his over-all arrangements.

The resonators are spaced along the wave guides in Fig. 1, from center to center of successive resonator to wave guide coupling points, at approximately one-half wavelength intervals of the median frequency of the channel or band of frequencies being transmitted. The resonators nearest a closed end of a wave guide, in Figs. 1 and 2, are spaced so that the coupling point centers are substantially one-quarter wavelength of the median frequency of the frequency range of particular interest, from the end of the wave guide, in each instance. The other resonators are preferably spaced so that the coupling point center of each resonator is one-quarter wavelength plus an integral number of half wavelengths, of the median frequency of the band of frequencies transmitted through it, from the closed end of the wave guide to which it is coupled.

It is assumed, in Figs. 1 to 4, inclusive, as will usually be the case in practice, that the coupling points between resonators and wave guides lie on the longitudinal center lines of the resonators.

Throughout this specification, its accompanying drawings, and in the appended claims, when wavelength is referred to in connection with wave guide structures, it is to be understood, unless otherwise specified, that the wavelength referred to is the wavelength within the structure, rather than the wavelength of the same energy in free space. As is well known to those skilled in the art, the wavelength of a particular frequency of microwave energy in free space is different from its wavelength when being transmitted through a wave guide structure. In general, the wavelength of energy of a particular frequency in a wave guide is usually greater than for the same frequency of energy being transmitted through free space.

The arrangement of Fig. 2 is substantially identical with that of Fig. 1 except that the two wave guides 1 and 2 are both closed at their right ends and open at their left ends as shown. Their right ends are in vertical alignment. This arrangement permits each of the resonators 3 to 7, inclusive, to be more readily spaced from the closed ends of both the wave guides so that its longitudinal center line (which should preferably also be an axis of symmetry and should include the center line of the resonator to guide coupling arrangements) is more precisely an odd number of quarter wavelengths of the median frequency of the specific band, channel, or group of frequencies, to be transmitted through the particular resonator in passing from one wave guide to the other. As contrasted with this, in Fig. 1, some compromises in spacing will be required since each resonator should be positioned, as precisely as practicable, an odd number of quarter wavelengths of the median frequency of its particular pass-band from the closed ends of both the wave guides. The preferred spacing is expressed by the relation $$\frac{\lambda}{4} + \frac{\lambda}{2}$$

where $n$ is any whole number and $\lambda$ is the wavelength (in the guide) of the median frequency of the band passed by a particular resonator the position of which is to be determined.

In both Figs. 1 and 2, the resonators are coupled to the wave guides in what is designated in the art as a "shunt" relation. The meaning of the terms "shunt" and "series" in connection with wave guide couplings, or junctions, is discussed in detail in the above-mentioned copending application of W. D. Lewis. The newly published text "Microwave Mixers" by R. V. Pound, McGraw-Hill Book Co., Inc., New York city, 1948, at pages 259 to 262, also explains these terms as applied to wave guide junctions. The discussion below, in connection with Figs. 6 and 7, will tend to further clarify the meanings of these terms, from an electrical circuit standpoint, as employed in this specification.

Figure 3:
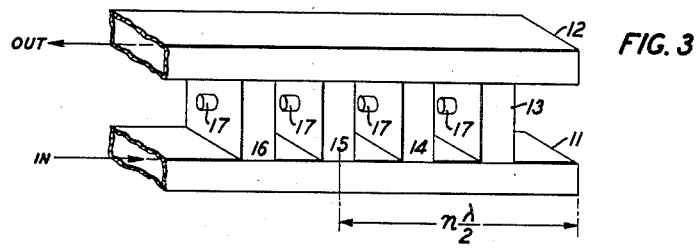
Fig. 3 shows a structure of the invention similar to that of Fig. 2 but of the "series coupling" type.

In Fig. 3 the two wave guides 11 and 12 are coupled to opposite ends of the resonators 13 to 16, respectively, in what is designated in the art as a "series" relation.

A tuning stub 17 is provided in each of the resonators 13 to 16, inclusive, to permit suitable adjustment of their respective resonances. The center line of each of these resonators, that is, their respective "points" of coupling to the wave guides, should be substantially a whole number of half wavelengths from the ends of the wave guides as expressed by the relation $$n\frac{\lambda}{2}$$

where $n$ is any whole number.

In many cases it will be possible to select any one of the three forms, illustrated in Figs. 1 to 3, inclusive, to provide the desired transducer action. In general, the choice between the "shunt" type of Figs. 1 and 2 or of the "series" type of Fig. 3 will be determined by the ease of coupling the particular form or shape of resonator used, to the particular form or shape of wave guide used (rectangular, square, or round, etc.).

Figure 4:
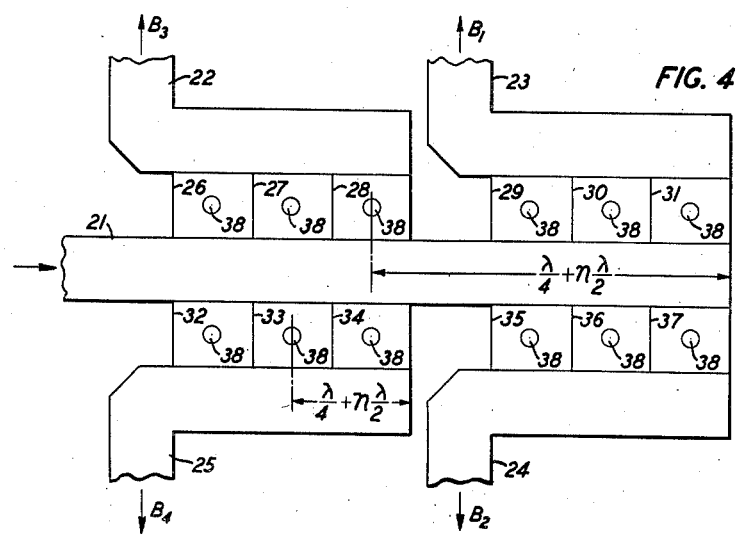
Fig. 4 shows a branching filter which includes four wave filter structures of the general type illustrated in Figs. 1 and 2, assembled to connect one wave guide to four other wave guides so that four frequency bands, $B_1$ to $B_4$, inclusive, present in the first-stated wave guide, can be separated and directed, one each, into the four other wave guides, respectively.

In Fig. 4 an adaptation and extension of the arrangement shown in Fig. 2 is illustrated which will provide for the separation of four frequency bands or channels, designated, for example, $B_1$, $B_2$, $B_3$ and $B_4$. These channels could be, for example, four of the five channels of the illustrative microwave system described in detail in the above-mentioned application of W. D. Lewis.

The resonators 26 to 37, inclusive, are apportioned, three to a filtering structure, as shown in Fig. 4, each group of three being adjusted so as to pass or transmit its particular band or channel of frequencies only, to its associated channel or branching wave guide of the wave guides 22 to 25, inclusive, respectively, from the main wave guide 21, in which all of the channels $B_1$ to $B_4$, inclusive, are present.

The center line of each resonator is an odd number of quarter wavelengths from the closed (right) end of main wave guide 21, as well as from the closed end of its associated branching wave guide. In each instance the wavelength is preferably taken as that of the median frequency of the group of frequencies passed, or transmitted, by the particular resonator being considered.

Figure 5:
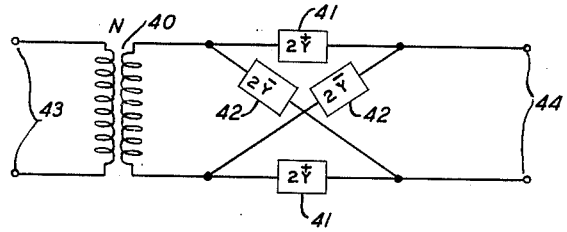

In Fig. 5 a block diagram representation of a conventional "lumped-element" lattice structure is shown in which transformer 40 represents an "ideal transformer" providing whatever impedance transformation (if any) is effected between the input terminals 43 and the output terminals 44 of the structure. In many cases no impedance transformation is desired, in which cases the "ideal transformer" should have a 1:1 ratio. The lattice structure proper is represented by the series arm admittances 41, each being designated $$\frac{+}{2Y}$$

and the shunt, or crossed, arm admittances 42, each being designated $$\frac{-}{2Y}$$

The voltage waves reaching terminals 44 through the crossed arms 42 are, obviously, by virtue of the circuit arrangement, inverted in phase so that the crossed arms can be considered as providing an inverted or "contrary" connection to the output terminals 44, with respect to the "direct" connection afforded by the series arms 41. From this it is apparent that the lattice type structure can be simulated by the combination of two coupling structures, or groups of coupling structures, one of which provides a "direct" coupling having a total admittance of $$\frac{+}{Y}$$

and the other of which provides a "contrary" coupling having a total admittance of $$\frac{-}{Y}$$

Figure 6:
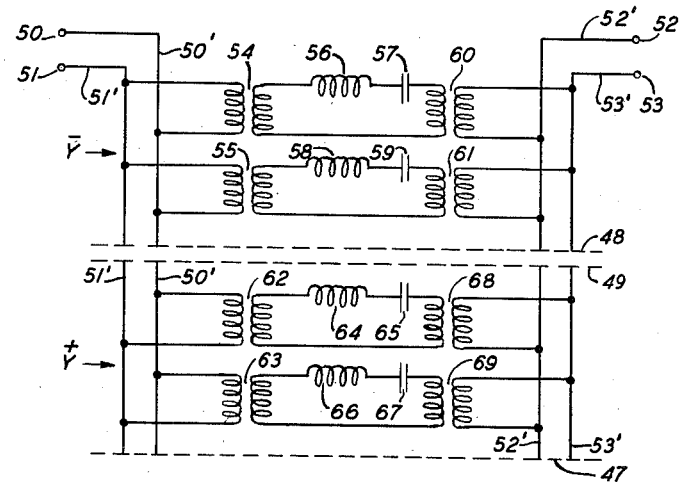

In Fig. 6 an electrical schematic diagram of a circuit is shown, which is substantially a low frequency or "lumped-element" equivalent of the general type of the devices of Figs. 1 and 2 and which can be made equivalent to the lattice structure of Fig. 5, provided that admittances $$\frac{+}{Y} \text{ and } \frac{-}{Y}$$

are suitably proportioned. In this figure, which is a reasonably accurate representation of the structures of Figs. 1 and 2, if the resonators are substantially loss-free, $$\frac{-}{Y}$$

can be represented by a resonant circuit or a plurality of resonant circuits such as those comprising inductance 56 and capacity 57 connected in series and inductance 58 and capacity 59 connected in series, the transformers 54, 60, 55 and 61 serving to furnish any impedance transformations that may be required to provide matched impedances throughout the circuits and to couple their respective input and output ends to the input terminals 50, 51 through the associated conductors 50', 51' and to the output terminals 52, 53 through the associated conductors 52', 53', respectively, as shown in Fig. 6.

In like manner $$\frac{+}{Y}$$

can be represented by one or more resonant circuits such as those comprising inductance 64 and capacity 65 connected in series and inductance 66 and capacity 67 connected in series, the transformers 62, 68, 63 and 69 serving to furnish appropriate impedance transformations, if required, and to couple their respective input and output ends to the terminals 50, 51 through the conductors 50', 51' and to the terminals 52, 53 through the conductors 52', 53', respectively, as shown in Fig. 6.

One of the four pairs of input or output transformers of Fig. 6, i. e., one of the pairs of transformers 54, 55; 62, 63; 60, 61; or 68, 69; should be connected to provide a reversed coupling to input terminals 50, 51 or to output terminals 52, 53.

In order to correspond diagrammatically more closely to general concept as represented by the lattice network of Fig. 5, it might be preferable to have transformers 54, 55 or 60 and 61 provide the reversed or "contrary" coupling, though the end result is, obviously, the same if the reversed coupling is provided by transformers 62, 63 or 68 and 69. As shown in Fig. 6, transformers 62, 63 are reversed, with respect to transformers 54, 55, in coupling to the input terminals 50, 51.

The breaks represented by dashed lines 48, 49 in the conductors 50', 51'; 52', 53' are to indicate that other direct and contrary coupled resonant circuits can be inserted, so as to make a transducer with more than four resonators.

The lower ends of conductors 50', 51' and 52', 53' are left open-circuited to correspond to the high impedance which is present at the coupling points, by way of example, of resonator 3 of Fig. 2 and results, of course, from the quarter wavelength spacing from the short-circuited ends of wave guides 1 and 2.

All of these transformers are usually simple unit ratio substantially ideal transformers, though an appropriate impedance transformation could, obviously, readily be introduced by the transformers were the impedance of the source connected to the input terminals different from that of the load connected to the output terminals. The "impedance level" of the coupling circuit can obviously also be raised or lowered to afford more conveniently realizable inductance or capacity values or more convenient dimensions for the resonators in high frequency structures, and appropriate impedance transformations to match the impedance of the source and load can then be introduced by the coupling transformers, or their counterparts, i. e. the high frequency coupling structures. The most efficient transfer of power requires, of course, the matching of the impedances at all junction points of the system.

Obviously, also, any desired complexity of the admittances $$\overset{+}{Y} \text{ or } \overset{-}{Y}$$

can be realized by utilizing an appropriate number of resonant circuits, which could appear between dashed lines 48 and 49 and below line 47 in Fig. 6, so that it is apparent that a structure of the general character represented by the schematic circuit of Fig. 6 can accurately simulate any lattice type structure, as illustrated in Fig. 5. Since all of the resonant circuits are connected in shunt across the input and output terminals 50, 51 and 52, 53, this type of structure is designated as being of the "shunt" type. The terminals are, of course, the low frequency counterparts (or substantially equivalents) of the input and output ends of the wave guides 1 and 2 of Figs. 1 and 2, respectively, the resonant circuits are, speaking generally, the low frequency counterparts of resonators such as the resonators 3 to 7, inclusive, of Figs. 1 and 2, and the transformers are the low frequency counterparts of the coupling arrangements connecting the wave guides and resonators including the effects of the spacing of the resonators relative to one another and to the closed ends of the wave guides.

Figure 7:
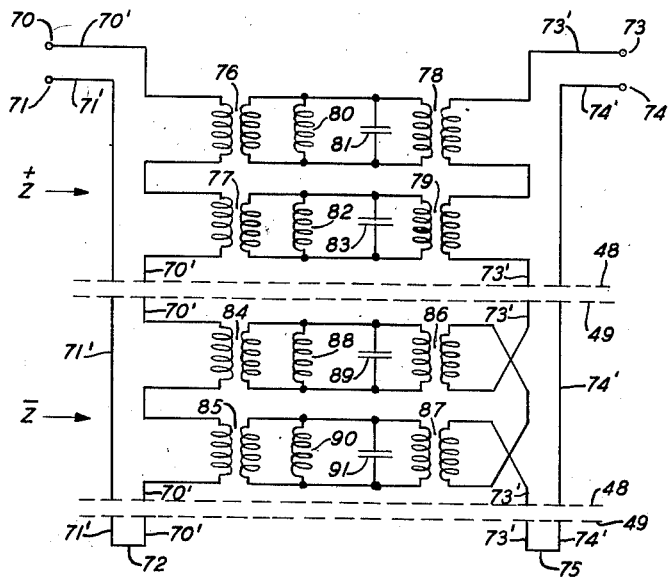

The alternative "series" type of circuit, shown in "microwave" form in Fig. 3, is illustrated by the equivalent low frequency electrical schematic diagram of Fig. 7. Since the series type of circuit is more conveniently manipulated mathematically on the basis of impedance, "direct" and "contrary" coupled impedances $$\overset{+}{Z} \text{ and } \overset{-}{Z}$$

are indicated.

The impedance $$\overset{+}{Z}$$

is represented as comprising two parallel resonant combinations (sometimes called anti-resonant combinations) comprising coil 80 and condenser 81 connected in parallel, and coil 82 and condenser 83 connected in parallel, with input transformers 76 and 77 and output transformers 78 and 79 coupling these combinations to the input terminals 70, 71 through conductors 70' and 71' and the output terminals 73, 74 through conductors 73' and 74', respectively.

Similarly, the "contrary" connected impedance $$\overset{-}{Z}$$

is represented by parallel resonant circuits comprising inductance 88 and capacity 89, connected in parallel, and inductance 90 and capacity 91, connected in parallel, the circuits in turn being coupled to terminals 70, 71 and 73, 74 by conductors 70', 71' and 73', 74' respectively and by input transformers 84, 85 and output transformers 86, 87, respectively, the last-stated transformers providing, in this instance, the "contrary" coupling desired.

As in the case of Fig. 6, the transformers of Fig. 7 are normally of unity ratio but can be proportioned to introduce an appropriate change in impedance should the source be of different impedance from the load or should it be desirable to raise or lower the impedance level of the resonant combinations to obtain more favorable or convenient impedance element values.

In the case illustrated in Fig. 7, the transformers are connected in series between the input and output terminals, and the local (lower) ends of the conductors 70', 71' and 73', 74' are short-circuited by conducting members 72 and 75, respectively. This corresponds, as is well known to those skilled in the art, to the effective short circuit appearing at the point of coupling of resonator 13 of Fig. 3 by virtue of the half wavelength spacing from the closed ends of wave guides 11 and 12. The breaks represented by dashed lines 48, 49 indicate where further resonant circuits and transformers may be connected.

As in the case of the circuit of Fig. 6, in Fig 7 one resonant circuit or more than two resonant circuits can be employed to provide the desired impedances $$\overset{+}{Z} \text{ or } \overset{-}{Z}$$

as convenience in simulating the required impedances may dictate, two having been shown in both Figs. 6 and 7 solely for purposes of illustration.

In both Figs. 6 and 7 the couplings provided by all of the transformers are normally substantially identical except for the inversions required to provide "contrary" couplings. Increasing the coupling of any transformer, however, is equivalent to decreasing the inductance and increasing the capacity of the associated resonant circuit. Alternatively a single transformer can obviously be employed to couple two or more resonant combinations to the terminals, where no unique change in impedance or direction of coupling is required for any individual resonant combination.

Tuning a resonator, as for example, by adjusting the protrusion of the tuning stub in a resonator used in the devices of the invention, such as those shown in Figs. 1 to 3, inclusive, has the effect of changing the effective inductance or capacity or both of the resonator.

While the potential equivalence of the arrangements of the invention, whereby one wave guide is coupled to another through a plurality of microwave resonators, some of which provide "direct" and others of which provide "contrary" coupling, to the lattice type network of the lumped-element, low frequency kind, so well known to those skilled in the art, may appear evident from the above description of Figs. 5, 6 and 7, it can be made more clearly apparent by the following simple analysis of one phase of this relation.

The arrangement of Fig. 6, by way of example, can be represented by the simplified block schematic of Fig. 8, where all the resonators taken collectively can be represented by block 92 as a four-terminal transducer. Admittances 93 and 94 represent the characteristic, purely conductive admittance (or conductance) "M" of appropriate wave guides, which are assumed to be connected to the input and output terminals of the transducer 92, as shown. These admittances are assumed to be substantially pure conductances, as will be the case for properly proportioned and terminated wave guides.

The energy of the source is represented by an impressed current of 2I, in accordance with a conventional well-known method of network analysis. This signifies that I is the current which flows in the output termination 94 of Fig. 8 when transducer 92 is removed and the load and source are directly connected.

The following equations will then be applicable:

$$V_1(M+Y_{11}) + V_2 Y_{12} - 2I_1 = 0 \quad (1)$$
$$V_2(M+Y_{22}) + V_1 Y_{21} = 0 \quad (2)$$
$$V_2 = -I_2/M \quad (3)$$

We may solve these for the input admittance of the transducer and load, $Y_i$, and the ratio $I_1/I_2$ $$V_1(M+Y_i) - 2I_1 = 0 \quad (4)$$

$$Y_i = (M+Y_{11}) - \frac{Y_{12}Y_{21}}{M+Y_{22}} - M \quad (5)$$

$$I_1/I_2 = +\frac{(M+Y_{22})(M+Y_{11})}{MY_{21}} - \frac{Y_{12}}{M} \quad (6)$$

As the transducer is passive $$Y_{21} = Y_{12} \quad (7)$$

As it is symmetrical $$Y_{11} = Y_{22} \quad (8)$$

From Fig. 6 we see that $$Y_{11} = Y_{22} = \overset{+}{Y} + \overset{-}{Y} \quad (9)$$

$$Y_{12} = Y_{21} = \overset{+}{Y} - \overset{-}{Y} \quad (10)$$

Thus, we obtain $$Y_i = \frac{M(\overset{+}{Y}+\overset{-}{Y})}{M+\overset{+}{Y}+\overset{-}{Y}} + \frac{4\overset{+}{Y}\overset{-}{Y}}{M+\overset{+}{Y}+\overset{-}{Y}} \quad (11)$$

$$\frac{I_1}{I_2} = \frac{\overset{+}{Y}+\overset{-}{Y}}{\overset{+}{Y}-\overset{-}{Y}} + \frac{M}{2(\overset{+}{Y}-\overset{-}{Y})} + 4\frac{\overset{+}{Y}\overset{-}{Y}}{M(\overset{+}{Y}-\overset{-}{Y})} \quad (12)$$

If $|I_1/I_2| = 1$, the transducer gives perfect transmission.

Now, $$\overset{+}{Y} \text{ and } \overset{-}{Y}$$

are admittance functions, as illustrated by curves 95 and 96, respectively, of Fig. 9, having a number of "poles," or antiresonances, $a$ to $h$, inclusive, one located at the resonance of each resonator, and "zeros," or resonances, $i$ to $n$, inclusive, between the "poles." Since the admittance "Y" is the reciprocal of the impedance "Z" of any reactive structure the "resonances" of the admittance curves will correspond in frequency with "antiresonances" of the impedance curve and antiresonance of the admittance curve will correspond in frequency with "resonances" of the impedance curve. In either case an antiresonance must occur between two successive resonance must occur between two successive resonances and vice versa. See "A Reactance Theorum" by Ronald A. Foster, Bell System Technical Journal, volume 3, page 259, April 1924. Accordingly the admittance curves of Fig. 9 correspond to a transducer of the invention having a total of eight resonators, four of which are "direct" coupled and four of which are "contrary" coupled. The admittance of the four "direct" coupled resonators is then represented by curve 95 and these four resonators are resonant at frequencies $a$, $b$, $c$, and $d$, respectively. Similarly, the admittance of the four "contrary" coupled resonators is represented by curve 96 and the four contrary coupled resonators are resonant at frequencies $e$, $f$, $g$ and $h$, respectively. Several forms of transducers of the invention having eight resonators, four of which can be "direct" coupled and four of which can be "contrary" coupled are described in detail hereinunder. Since in Fig. 9 the resonant and antiresonant frequencies, $i$, $j$, $k$, and $b$, $c$, $d$, respectively, of curve 95 correspond in frequency with the antiresonant and resonant frequencies, $e$, $f$, $g$, and $l$, $m$, $n$, respectively, of curve 96 and antiresonances $a$ and $h$ of curves 95 and 96, respectively, have no corresponding "critical" frequency (pole or zero) in the other curve, by elementary lattice type filter theory, the transducer having its resonators adjusted to produce admittances corresponding to those represented by curves 95 and 96 of Fig. 9, is a band-pass wave filter having its lower cut-off at frequency $a$, its upper cut-off at frequency $h$ and transmitting the band of frequencies between frequencies $a$ and $h$. A transducer of the invention having two groups or sets of resonators, one of which comprises "direct" coupled resonators and the other of which comprises "contrary" coupled resonators, the resonant frequencies of which resonators, are arranged generally as illustrated in Fig. 9 can provide, therefore, a band filter, throughout the transmission band of which the nature of the phase or delay characteristic, can be precisely controlled to provide any one of a large number of widely different phase, or delay, versus frequency characteristics, simply by appropriately spacing the zeros and poles of the two groups of resonators in precisely the manner taught by Bode and Bode and Dietzold in their above-mentioned papers. Phase or delay equalization over any desired portion of the guided wave frequency range can therefore be realized by the use of such a structure having a transmitting band which includes the portion of the frequency range to be equalized. A larger or smaller number of critical frequencies can of course readily be realized by increasing or decreasing the number of resonators in each group. In general, the transmission band of the phase or delay equalizing structure should substantially overlap both ends of the frequency range over which precise phase or delay equalization is desired so that the more abrupt changes usually encountered near the cut-off (band edge) frequencies will not fall within the frequency region being employed. It might here be noted in passing, that Bode teaches, for "lumped-element" low frequency structures, the spacing of critical frequencies to obtain a substantially linear phase characteristic throughout the entire transmission band and even somewhat beyond the cut-off frequencies but such complicated arrangements do not yet appear necessary in the guided wave frequency region. The possibility of obtaining such characteristics, however, is here noted as involving merely a straight-forward application of the principles of the present invention. Where a more steeply rising attenuation characteristic providing greater attenuation over portions of the attenuated frequency regions not far removed from the cut-off frequencies, it will at times be desirable to position some of the critical frequencies of both the "direct" and "contrary" coupled resonators in such attenuated frequency regions. One such an arrangement is illustrated by the admittance diagrams shown in Fig. 42 and will be described in detail hereinunder.

The admittance curves of an illustrative very simple band-pass wave filter of the invention, employing only two "direct" coupled resonators and one "contrary" coupled resonator are shown in Fig. 43 and will also be described in detail hereinunder.

It is apparent from Equation 12 given above that if, for example, either $$\overset{+}{Y} \text{ or } \overset{-}{Y}$$

is infinite, the first term has a magnitude unity and the second term is zero. If, in addition, either $$\overset{+}{Y} \text{ or } \overset{-}{Y}$$

is zero, the third term is zero and $I_1/I_2 = \pm 1$. Thus, if we make the poles of $$\overset{+}{Y}$$

coincide with the zeros of $$\overset{-}{Y}$$

and the zeros of $$\overset{+}{Y}$$

coincide with the poles of $$\overset{-}{Y}$$

we will have prefect transmission at the frequencies of these pole-zero combinations.

Further, somewhere between a pole and a zero of $$\overset{+}{Y}$$

we will have $$\overset{+}{Y} = -\overset{-}{Y} = \pm jB \qquad (13)$$

For a nearly even spacing of poles and zeros this will be about half-way between a pole and a zero. For the frequency at which Equation 13 holds we have $$\frac{I_1}{I_2} = \pm j\frac{1}{2}(M/2B + 2B/M) \qquad (14)$$

From this it is obvious that at this frequency we will have perfect transmission with $\pm$ 90-degree phase shift if $$B = M/2 \qquad (15)$$

Thus: (1) if we tune the "directly" coupled $$(\overset{+}{Y})$$

and "contrarily" coupled $$(\overset{-}{Y})$$

resonators so that the poles of one set lie at the same frequencies as the zeros of the other set, at these frequencies we get perfect transmission with $\pm$ 180-degree phase shift (2) if we adjust the coupling of the resonators so that at frequencies where $$\overset{+}{Y} = -\overset{-}{Y}$$

the absolute values of $$\overset{+}{Y} \text{ and } \overset{-}{Y}$$

are equal to $M/2$, we will get perfect transmission at these frequencies.

This presents, by a simple process of "spot-check" analysis, a reasonably clear picture of the action of a properly adjusted paralleled resonator transducer. Suppose we consider a frequency within the transmitted band of frequencies at which a direct coupled resonator is resonant. At this frequency the sum of transmission through contrary coupled resonators is zero. As we raise the frequency, a contrary coupled resonator tuned to a higher frequency begins to transmit. About half-way between the resonant frequency of the direct coupled resonator and that of the contrary coupled resonator the transmission between the two is equal and the phase shift is —90 degrees. At a still higher frequency all transmission will be through the contrary coupled resonator and the direct coupled resonators will transmit nothing; the phase will then be —180 degrees. As the frequency is raised, the phase will thus gradually increase and transmission will shift from one resonator to another.

This immediately tells us (in conformance with fundamental filter theory) that to get a substantially linear phase characteristic throughout the transmitted band of frequencies we need merely provide equal frequency spacings between zeros and poles. If, however, we want to get as sharp a cut-off as possible for a given number of resonators it is then necessary to tune to frequencies which are relatively far apart and to couple tightly the resonators which are resonant near the center of the band and to tune to frequencies which are relatively close together and couple loosely the resonators which are resonant near the edges of the band, always, of course, throughout the transmitted band, making the zeros of one set of resonators ("direct" coupled) and the poles of the other set ("contrary" coupled) coincide, and fulfilling the relations expressed by Equations 14 and 13. This gives a slow variation of phase with frequency near the center of the band and a rapid variation near the edges. The principles involved are precisely those evolved by Bode and Dietzold for low frequency lattice type "lumped-element" structures. They are explained in the Bode, and Bode and Dietzold, papers mentioned above, and are also summarized by Terman at pages 238 to 244 of his above-mentioned handbook.

Furthermore, precisely as taught by Bode for lumped-element structures, in the frequency regions it is desired to suppress in the output of the filtering structure the zeros, if any, of the "directly" coupled reactive structures in these regions should correspond in frequency with zeros of the "contrarily" coupled reactive structures in these regions and poles of the "directly" coupled structures should correspond in frequency with the poles of the "contrarily" coupled structures. An odd zero or pole in one or the other group of structures defines the "cut-off" frequency at the edge of a transmitting region. For example, see Fig. 104 on page 239 of the above-mentioned Radio Engineer's Handbook by F. E. Terman. Such arrangements are illustrated by the diagrams of Figs. 42 and 43 and explained in detail hereinunder. It is frequently convenient, but is not necessary, that the resonators, reckoned in order of their successively increasing frequencies of resonance, be distributed along the interconnected transmission lines with "direct" and "contrary" coupled resonators occurring alternately.

Branching filters

We have, so far, said nothing about branching filters. Suppose we examine Equation 11, with respect to the input admittance of a filter. We see that far outside the band, where $$\overset{+}{Y} \text{ and } \overset{-}{Y}$$

approach zero the input admittance $Y_i$ approaches zero. This means that outside of the band both the conductance $G_i$ and the susceptance $B_i$, the real and imaginary components of admittance $Y_i$, respectively, must decrease as we go further from the band.

From the symmetry of the admittance plots of Fig. 9 it is almost obvious that for a filter adjusted symmetrically with respect to frequency, at a given distance from the center above the band, $G_i$ will be the same as at a given distance from the center below the band, but the susceptance in the two cases will be equal and opposite. Suppose, then, we couple in tandem two similar filters, for the first of which $G_1 = M/2$ at some frequency $f_m$ above the band and for the second of which $G_1' = M/2$ but $f_m$ lies below the band. Then, the sum of the susceptances will be zero at $f_m$; the sum of the conductances will be M, and the two filters in tandem will provide a match for the guide to which they are coupled. As both are matched in their bands, the match through one band and into the other should be good.

Thus, a branching filter as shown in Fig. 4 can be made to present a good match looking into the common wave guide over all the bands involved. In this case, however, the bands will overlap somewhat. If we do not want the bands to overlap we can (1) merely separate the bands sufficiently so that they do not overlap seriously, leaving the common guide unmatched in the intervals between the bands, or (2) provide "dummy" resonators arranged to simulate the input impedances of filters which pass the inter-band intervals and which work into dissipative or resistive terminations as a "load."

Fig. 10 shows a simple form of the last-mentioned type of branching filter. Here we have a two-way branching filter, with bands $B_1$ and $B_3$ present in wave guide 100 being separated and directed to output wave guides 101 and 102, respectively. The resonators 105 and 106 between them pass band $B_3$, excluding band $B_1$, while resonators 107 and 108 between them pass band $B_1$ and exclude band $B_3$. Tuning stubs 109 are provided to adjust the tuning of these resonators. Energy in an intervening band $B_2$ goes into a resonator 103 with adjustable tuning stub 109, adjustable coupling to the common guide and adjustable loss stub 104. (The loss can be adjusted, for instance, by screwing the stub 104 of "lossy," i. e. energy dissipating, material further into or out of the resonator, as is well known to those skilled in the art.) The parameters of this resonator are adjusted to provide an impedance match to the common guide in the frequency range between the frequency bands $B_1$ and $B_3$. Adjustable couplings suitable for use with device 103 and resonators 105 to 108, inclusive, will be described hereinunder. As an alternative way of viewing the situation we can consider that, in Fig. 10, output $B_2$ is terminated in its characteristic admittance and suffered to exist merely as a means for providing an appropriate impedance termination for the common guide 100 between bands $B_1$ and $B_3$.

Specific suggestions for resonator shape, coupling, etc.

As we have seen, some of the resonators in a paralleled resonator transducer preferably provide coupling between input and output guides in one sense, and others in the other or opposite sense ("direct" and "contrary" coupling). There are at least two solutions to this problem leading to somewhat different paralleled resonator transducer designs. One of these is to locate the resonators for either "shunt" or "series" relation substantially as shown in Figs. 1 to 4, inclusive, and described in detail above and to provide coupling means which are somewhat different for different resonators. Such coupling means are described hereinafter. The other solution is to provide similar coupling means for all resonators but to locate the resonators somewhat differently. This latter solution will be discussed below.

Direct and contrary coupling means

Figs. 11A and 11B to 13, inclusive, illustrate, by way of example, another possible construction for an 8-resonator transducer of the invention. The input and output guides 110 and 111 are overlapped with their larger dimensions contiguous, as shown, and are coupled by four resonators on each side. Wave guide 110 is closed at its right end and wave guide 111 is closed at its left end. In the front side view of Fig. 11B, the four resonators on the front side are designated 113 to 116, inclusive. Four similar resonators 113a to 116a, shown in top view Fig. 11A, are assembled on the back side, immediately behind the front resonators, 113 to 116, respectively. Resonator 116a appears also in the end view of Fig. 12. The eight resonators (front) 113 to 116, inclusive, and (rear) 113a to 116a, inclusive, can preferably be of rectangular configuration, their respective dimensions as shown in the cross-sectional view of Fig. 13 through resonators 115, 115a being approximately $$\frac{\sqrt{2}}{2}$$

free-space wavelengths in depth of the median frequency of the band to be transmitted through any particular resonator. The coupling means are the wires, 118 to 121, inclusive, shown in both Figs. 12 and 13, extending in the direction of the electric fields, 127, 127' and 126, 126' of Fig. 13, in both the resonators and the guides, respectively, as shown more clearly in the cross-sectional view taken through resonators 115, 115a and the two guides 110, 111, in Fig. 13. Coupling wires 118 to 121 can, for example, be of round wire, approximately one-sixteenth inch in diameter and, for example, of a total length of one-half wavelength, or somewhat more, or less, if it is desired to avoid resonant couplings. These coupling wires should have portions parallel to the electric field in the wave guides, or resonators, which are extended approximately halfway or less from the center to the nearest wall surface. Arrows 126, 126', 127, 127', of Fig. 13, indicate the directions of the electric vectors in the wave guides and resonators, respectively, as shown. The coupling wires 118 to 121, inclusive, can be held centrally with respect to apertures 122 to 125, shown in Fig. 13, inclusive, respectively, by dielectric washers or bearings, not shown. Any suitable low loss, low dielectric-constant material such as polystyrene can be employed for this purpose. Rotation of the wires about their horizontal portions as shown in Figs. 12 and 13 can change the magnitude and phase of the coupling; settings for "direct"

$$+ \atop (Y)$$

coupling (resonator 115) and "contrary"

$$- \atop (Y)$$

coupling (resonator 115a) are shown in Fig. 13. The positions of the coupling wires 118 to 121 shown in Fig. 12 correspond to a "direct" coupling of resonator 116a and a "contrary" coupling of resonator 116 between the wave guides 110, 111. Intermediate positions will result in decreased magnitude of coupling, the minimum coupling being obtained when one wire of a pair is at 90 degrees with respect to the other. Individual tuning stubs 112, are provided with each resonator to change the resonant frequencies of the resonators 113 to 116 and 113a to 116a, inclusive, as necessary to obtain the characteristics required. The resonators on each side should be coupled to the input and output guides at points substantially one-half wave, of the median frequency of the respective bands transmitted, apart and at an odd number of quarter wavelengths from the closed ends of the wave guides, as for the structures of Figs. 1 to 3, inclusive.

Figure 14:
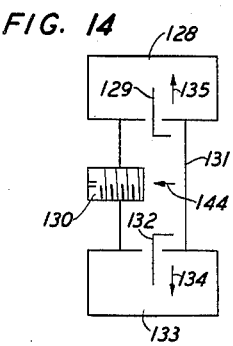
Figure 15:
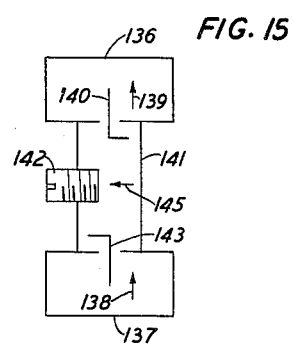

Figs. 14 and 15 illustrate, in cross-sectional views, another physical arrangement for coupling input and output guides by resonators.

In Fig. 14, the input wave guide 133 is coupled to the output wave guide 128 by the intermediately placed resonator 131. The directions of the electric vectors are indicated by arrows 134 and 135 for the wave guides 133 and 128 respectively, and by arrow 144 for the resonator 131. Tuning stub 130 permits adjustment of the resonant frequency of resonator 131 by, in effect, changing the capacity of the resonant circuit. Coupling wires 132 and 129 act as antennas in the wave guides and resonator and can provide an appreciable additional direct coupling between wave guides 133, 128. Again, the coupling wires can be held by dielectric washers or bearings (not shown) in the orifices between the resonator and the guides and the phase and magnitude of the coupling can be varied by rotating one coupling wire with respect to the other about its vertical portion, with results in general similar to those obtaining in the arrangement of the type illustrated in Fig. 13, and described above. The coupling between the wave guides as shown in Fig. 14 is of the "contrary" type.

In Fig. 15 the input wave guide 137 is coupled to the output wave guide 136 by the intermediately placed resonator 141. Arrows 138 and 139 indicate the directions of the electric vectors for wave guides 137 and 136 respectively. Arrow 145 indicates the direction of the electric vector in resonator 141. This arrangement provides a "direct" coupling as contrasted with the "contrary" coupling as shown in Fig. 14, but is otherwise similar.

Figure 16:
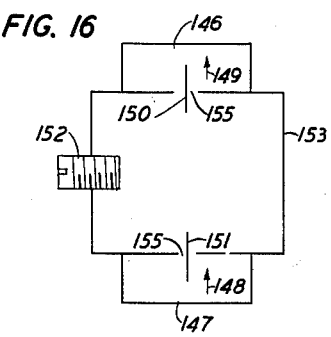
Figure 17:
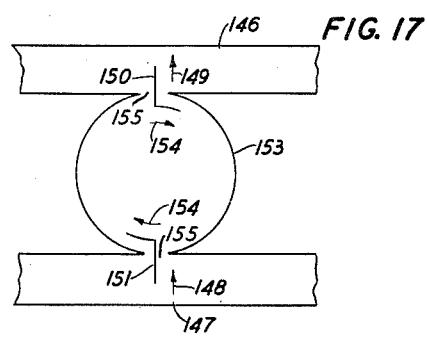

Figs. 16 and 17 show two cross-sectional views of a coupling between input and output guides 146 and 147 by an "H-O mode" resonator 153. Such resonators have low loss. The "H-O mode" resonator is disclosed and described, for example, in the handbook "Reference Data for Radio Engineers," published by the Federal Telephone and Radio Corporation, 67 Broad Street, New York, New York, 2nd edition, 1946, at pages 215 and 221. In Figs. 16 and 17 arrows 148 and 149 indicate the direction of the electrical vector in wave guides 147 and 146 respectively. Arrows 154, in Fig. 17, indicate the direction of the electric vector within the resonator 153. Resonator 153 is substantially in the form of a simple right circular cylinder. Its diameter can be at least .725 free-space wavelength, or greater, and its height, or length along the longitudinal axis, at least one-half wavelength, for H-O propagation in such a cylinder, of the median frequency of the frequency band to be transmitted from one wave guide to the other. The length will thus usually be somewhat more than one-half free-space wavelength. The orifices 155 can be circular openings of approximately $\frac{1}{10}$ or $\frac{1}{20}$ wavelength diameter. The wires 150 and 151 act as antennas to couple the resonator 153 to the guides 146 and 147. They can be substantially one-half free-space wavelength long to provide a resonant antenna with a strong coupling, or somewhat shorter, or longer, if non-resonant coupling is desired. The coupling will be greater the farther the wire extends into the wave guides. Minimum coupling will be attained if the bent portions of these wires are located about half-way between the wall and the center of the resonator 153.

Figure 18:
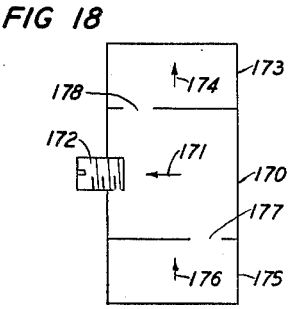
Figure 19:
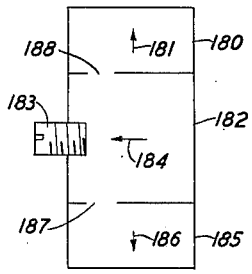

Figs. 18 and 19 show an arrangement of input and output guides and resonators using irises instead of bent wires as the coupling means. In Fig. 18 the input wave guide 173 is coupled to the output wave guide 175 by a resonator 170. The directions of the electric fields in the guides are shown by arrows 174 and 176, respectively, and the direction of the field in the resonator is shown by the arrow 171. The resonator can be tuned by the tuning stub 172. The irises 177 and 178 couple the resonator to the guides. Part of the current which flows in the walls of the guide 173 (assuming it to be the "input" guide), transverse to the direction of propagation, excites, in the vicinity of the aperture 178, a current in the resonator 170. Part of the wall current of the resonator 170 excites, in the vicinity of the aperture 177, a transverse wall current in the wave guide 175. The excitation of the current, that is, the coupling, will be greater the larger are the apertures.

For operation at 4,000 megacycles, by way of example, the wave guides 173 and 174 can be one inch high and two inches wide. The resonator 170 can be two inches high, two inches wide and two inches deep normal to the plane of the paper. The apertures 178 and 177 can be holes about one inch in diameter, or one inch square.

Fig. 19 is similar to Fig. 18. The guides 180, 185, the resonator 182, the arrows 181, 184, 186, the tuning stub 183 and the iris 188 correspond respectively to 173, 175, 170, 174, 171, 176, 178 of Fig. 18. The iris of 187 of Fig. 19 is differently placed from 177 of Fig. 18 so as to excite a wave in guide 185, opposite in phase to that excited in guide 175, and hence to provide "contrary" instead of "direct" coupling.

These examples, of course, by no means exhaust the general approach illustrated. Numerous and varied other arrangements embodying the principles of the invention and within the scope and spirit thereof, will readily occur to those skilled in the art.

Parallel resonator transducers with similar coupling means for all resonators Figs. 20 to 23, inclusive, show two arrangements of paralleled resonators, whereby "direct" and "contrary" coupling, between the input and output wave guides, can be achieved using similar coupling devices in all resonators, as distinguished from the transducers of Figs. 1 to 4, inclusive, in which the use of similar coupling devices for all resonators would give either "direct" or "contrary" coupling, only.

Figure 20:
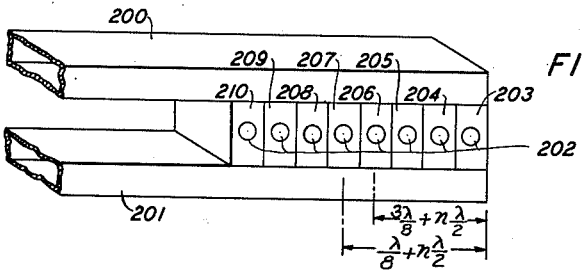
Figure 21:
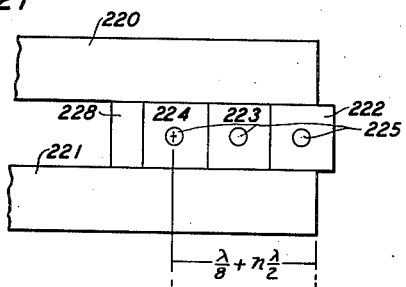
Figure 22:
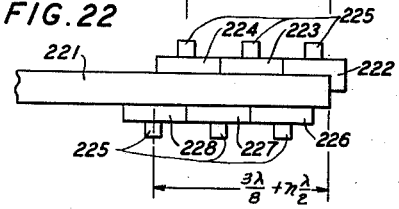
Figure 23:
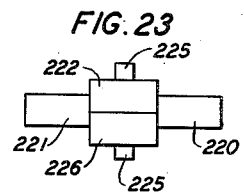

In Figs. 20 to 23, inclusive, the resonators which provide "direct" coupling are separated $\lambda/4$ or $(2n+1)\lambda/4$ (i. e. an odd number of quarter wavelengths) from resonators which provide "contrary" coupling. Thus a wave going into a guide and through a "contrary" resonator must travel an odd number of half wavelengths further to and from the resonator than if it went through a "direct" resonator. This provides the necessary 180-degree phase difference of coupling between the "direct" and "contrary" couplings. Fig. 20 shows a "series coupling" type transducer. Figs. 21 to 23, inclusive, are top, side and end views, respectively, of a "shunt coupling" type transducer. Fig. 24 shows an appropriate iris type couping means for the transducer of Figs. 21 to 23, inclusive.

In order for all resonators to see the same conductive component in looking into the input and output guides, each of which is shorted, or closed, at one end, "direct" resonators are coupled in $\lambda/8+n\lambda/2$ from the ends of the guides and "contrary" resonators $3\lambda/8+n\lambda/2$ from the shorted ends of the guides. Thus, a "direct" resonator will see a positive guide susceptance and a "contrary" resonator a negative guide susceptance. This will, of course, affect the tuning of the resonators a little, and the coupling also. It will, therefore, require a slightly different coupling adjustment for "direct" than for "contrary" resonators.

In more detail, in Fig. 20, the input wave guide 200 is coupled to the output wave guide 201 by four "direct" coupled resonators 203, 205, 207, 209, each located an integral number of half wavelengths plus one-eighth wavelength from the closed ends of guides 200 and 201, and by four "contrary" coupled resonators 204, 206, 208, 210, each located an integral number of half wavelengths plus three-eighths wavelength from the closed ends of guides 200 and 201. These resonators 203 to 210, inclusive, are tuned by threaded tuning screws or stubs 202. The resonators 203 to 210, inclusive, can be coupled to guides 200 and 201 by irises (or apertures). By way of example, for frequencies in the order of 4,000 megacycles, the cross-sectional dimensions of the wave guides can be approximately one inch by two inches and the dimensions of the resonators approximately one inch by two inches by two inches. The coupling apertures can be slits, approximately one-eighth inch long in the direction of propagation along the wave guides 200 and 201 and three-quarter inch to one and a half inches wide, normal to the direction of propagation in the wave guides.

While the resonators of Fig. 20 are coupled in "series" relation with each of the wave guides, the resonators of Fig. 21 are coupled in "parallel" relation with each of the wave guides 220, 221.

In Figs. 21 to 23, inclusive, the input wave guide 220 is coupled to the output wave guide 221 by means of three "direct" coupled resonators 222, 223 and 224, by means of apertures located an integral number of half wavelengths plus one-eighth wavelength from the closed ends of wave guides 220 and 221, and by three "contrary" coupled resonators, one of which, 228, is shown in Fig. 21, and the others of which, 226 and 227, are behind the direct-coupled resonators in the side view of Fig. 21. Both the direct-coupled resonators 222, 223 and 224 and the contrary-coupled resonators 226, 227 and 228 are shown in the bottom view of Fig. 22. The contrary-coupled resonators are coupled to the guide by irises or apertures located at points an integral number of half wavelengths plus three-eighths wavelength from the closed ends of wave guides 220 and 221. Resonators 222, 223, 224, 226, 227, 228 are tuned by tuning screws or stubs 225.

Fig. 22 shows how resonators 222, 223, 224 and resonators 226, 227, 228 are "overlapped" so that they can be properly located as described despite their physical length.

Fig. 24 shows, in a cross-sectional view, how a typical resonator 222, of Figs. 21 to 23, is coupled to the wave guides 220 and 221 by irises or apertures 235 and 236. The resonator is tuned by the tuning stub or screw 225.

In a typical transducer, as illustrated by Figs. 21 to 24 and described above, for frequencies in the order of 2,000 megacycles, by way of example, the cross-sectional dimensions of the wave guides can be two inches by four inches. The resonators can be approximately two inches by four inches by four inches. The coupling irises can be slits approximately one-quarter inch to one-half inch high in Fig. 24, and approximately one and one-half inches to three inches long in the direction of propagation of energy along the wave guide.

Figs. 25 to 28, inclusive, show modifications of the transducers of Figs. 20 to 24, in which one of the guides is made to extend $\lambda/4$ further to the right than the other at its closed end. Thus, either "direct" or "contrary" resonators see a positive susceptance in one guide and a negative susceptance in the other. In this case the coupling adjustments of any one resonator will be slightly different for the two guides.

Figure 25:
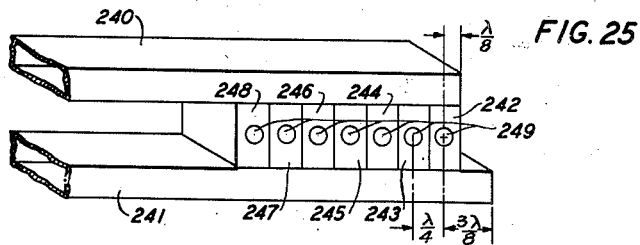

The resonators 242 to 248, inclusive, of Fig. 25 correspond to the resonators 203 to 210, inclusive, of Fig. 20. The tuning screws 249 of Fig. 25 correspond to the tuning screws 202 of Fig. 20. The input and output wave guides 240 and 241 of Fig. 25 correspond to the wave guides 200 and 201 of Fig. 20. In Fig. 25 each resonator, whether direct-coupled or contrary-coupled, is coupled at a point an integral number of quarter wavelengths plus one-eighth wavelength from the closed end of one of the guides 240, and an integral number of quarter wavelengths plus three-eighths wavelength from the closed end of the other of the guides 241. The wave guide and resonator dimensions given by way of example in connection with Fig. 20 apply equally well in connection with Fig. 25.

The transducer shown in Figs. 26, 27 and 28, showing side, top and end views, respectively, is similar to that shown in Figs. 21, 22, 23 and 24, except that the input wave guide 250 of Figs. 26, 27, 28, has been made to extend, relatively, one-quarter wavelength further to the right than the input wave guide 220 of Figs. 21, 22, 23 and 24. Otherwise, there is an exact correspondence between resonators 252, 253, 254, 256, 257, 258 of Figs. 26, 27, 28, and resonators 222, 223, 224, 226, 227, 228 of Figs. 21, 22, 23, 24, between tuning stubs 255 and 225 of Figs. 21, 22, 23, 24, and between output wave guide 251 of Figs. 26, 27, 28 and output wave guide 221 of Figs. 21, 22, 23, 24. The typical dimensions, given by way of example in connection with Figs. 21, 22, 23, 24, can be equally well used in connection with Figs. 26, 27, 28.

In the transducers of Figs. 20 through 28, inclusive, the resonators are $\lambda/4$ apart, instead of $\lambda/2$ apart as in Figs. 1 to 4, inclusive. This makes possible a very compact transducer, especially if compact resonators are used.

Figs. 29 through 31 illustrate the salient features of two compact types of resonator and coupling constructions particularly suited for use in transducers of the general type exemplified in Figs. 20 through 28, inclusive. The device shown in Figs. 29 can provide either "direct" or "contrary" coupling, depending upon whether the coupling stud combination 261, 262, or 261, 262', respectively. They can therefore also be readily and conveniently used in the transducers of the general type exemplified in Figs. 1 to 4, inclusive.

In Fig. 30 the wave guides are connected by a cylindrical opening through member 282 of too small an inner diameter for unattenuated propagation at the frequencies to be employed. By advancing a tuning screw or stub 283 into the center of the cylindrical opening through member 282 a resonant condition can be produced, with the fields substantially confined to the central region. By advancing tuning screws or stubs 284, 285 which are located toward the ends of the cylindrical opening through member 282, as shown, these fields can be spread out to couple to the guides.

In Fig. 29, a cross-sectional view of a transducer of the invention is shown in which the input wave guide 260 and the output wave guide 259 are coupled by a plurality of resonators, each of which, as shown in Fig. 29, is in the form of a rod type resonator 264 which, in the arrangement shown in Fig. 29, is conductively connected to the outer side of guide 260, passes through an aperture 260' in the adjacent inner sides of the guides 259, 260 and is capacitatively coupled to the outer side of guide 259. The resonant frequency of the resonant rod arrangement is adjusted by changing the last-mentioned end capacity by means of a tuning screw or stub 263. Rod 264 can preferably be enlarged at its right end into a disc 264' to increase its capacity with respect to tuning stub 263. As the rod lies in the plane of symmetry of the wave guides 259 and 260, it is not normally coupled to the undistributed electric fields (the electric vector being normally vertical in both guides) of these wave guides. To provide coupling, the fields in the wave guides are made focally unsymmetrical, in the vicinity of the rod 264, by means of coupling screws 261 and 262 (or 262'). The further these screws are advanced into the wave guide, the greater is the coupling between wave guide and resonator rod 264. Screws in positions 261, 262 produce "direct" coupling and screws in positions 261, 262' produce "contrary" coupling.

In Fig. 30 a cross-sectional view of a transducer of the invention is shown in which the input wave guide 280 is coupled to the output wave guide 281 by a plurality of resonators, such as that formed by the cylindrical passage 286 in the metal block 282. This passage is proportioned to be too small in diameter to propagate a wave at the normal frequencies at which the system is operated and hence has an inductive impedance. Passage 286 is made to resonate by adding capacitance by means of the tuning screw 283. The coupling of this resonance to wave guides 280 and 281 can be controlled by coupling screws 284 and 285. The further these three screws are advanced into the passage 286 the more the inductance of the passage is counteracted by the resulting added capacitance and the greater is the coupling between the resonator and the wave guides. Fig. 31 is a partial cross-sectional view through plane 31—31 of Fig. 30 showing the protrusion of tuning screw or stub 283 into the cylindrical passage 286.

In Fig. 30, by way of example, for operation at frequencies in the order of 4000 megacycles the wave guides 280 and 281 can be seven-eighths inch by one and seven-eighths inches in cross-section and the cylindrical passage 286 can be seven-eighths inch in diameter and from one inch to one and one-half inches long.

To illustrate how simply and compactly a filter can be made by the means described, a 4-way branching filter using resonators of the type described in connection with Fig. 29 is shown diagrammatically in Fig. 32.

Figure 32:
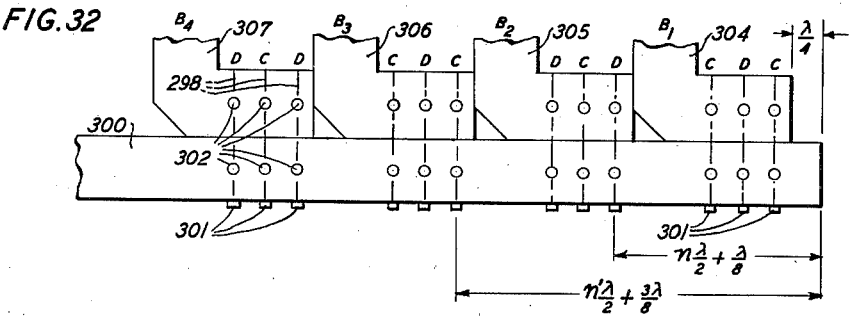

In Fig. 32, four bands of frequencies B1 to B4, inclusive, entering wave guide 300 are separated and emerge from wave guides 304, 305, 306 and 307. Or, conversely, the four bands of frequencies just mentioned can be sent into wave guides 304, 305, 306, 307, respectively, and all four will then emerge from wave guide 300. Each of the wave guides 304, 305, 306, 307 is coupled to wave guide 300 by means of a paralleled resonator type filter comprising three resonators of the general type shown in Fig. 29. These resonators each have two coupling screws 302 and a tuning screw 301. A portion of the resonators is located an integral number of half wavelengths plus one-eighth wavelength from the closed end of wave guide 300, and the other resonators are located an integral number of half wavelengths plus three-eighths wavelength from the closed end of wave guide 300. Similarly, the resonators are located either an integral number of half wavelengths plus one-eighth wavelength or an integral number of half wavelengths plus three-eighths wavelength from the closed ends of their respective associated wave guides 304, 305, 306, 307.

By way of estimating the difference to be expected between the behavior of a resonator of the invention coupling two wave guides and one of the "lumped-element" combinations in the shunt representation of Fig. 6, the following analysis is presented.

In Fig. 6 the contribution to $Y_{11}$ and $Y_{21}$ of $L_a$ and $C_a$, for instance, is $$(Y_{11})_a = (Y_{21})_a = \frac{1}{j\omega L_a + \frac{1}{j\omega C_a}} = \frac{-jM_a}{\frac{\omega}{\omega_a} - \frac{\omega_a}{\omega}} \quad (16)$$

$$M_a = \sqrt{C_a/L_a} \quad (17)$$

$$\omega = 1/2\sqrt{C_a L_a} \quad (18)$$

For small fractional deviations $\Delta\omega$ from $\omega_a$, very nearly $$(Y_{11})_a = (Y_{21})_a = \frac{-jM_a}{2\left(\frac{\Delta\omega}{\omega_a}\right)} \quad (19)$$

Equation 19 represents a degree of approximation which is normally adequate for microwave filters, since the fractional band width required of each resonator will normally be small and the ratio of the pass band width in cycles to the mid-band frequency in cycles will also be very small for the overall transducer.

The coupling between wave guides afforded by a resonator will differ somewhat from Equation 1 both in that $Y_{11}$ will not precisely equal $Y_{21}$ and in that the variations of both admittances with frequency will not precisely follow the required laws of variation. The first is probably the larger deviation.

For example, let us consider a typical coupling of a resonator to two wave guides by means of inductive irises as shown diagrammatically in Fig. 33. As a practical matter, under the usual conditions encountered in microwave systems, it can be assumed that the equivalent circuit is as shown in Fig. 34 and the following analysis is then applicable. The center of each guide is indicated in Fig. 34 by the letter C. The irises are located at a distance λ/4 from the shorted ends of the guides and the guides are terminated by their respective image impedances in the other direction, as indicated by the characteristic admittance of the guides M, represented by resistive impedances 331 and 332, respectively, as shown in Fig. 34.

The inductances 320 and 321 of Fig. 34 represents the shunt inductance of wave guide 311 of Fig. 33. The capacitance 322 of Fig. 34 represents the shunt capacitance of guide 311 of Fig. 33. The inductance 323 of Fig. 34 represents the inductance of the iris 313 of Fig. 33. The inductances 324 and 326 represent the inductance of resonator 312 of Fig. 33. The capacitance 325 of Fig. 34 represents the capacitance of resonator 312, including the adjustable contribution of the tuning screw or stub 315 of Fig. 33. The inductance 327 of Fig. 34 represents the inductance of the coupling iris 314 of Fig. 33, and the inductances 328 and 329 and the capacitance 330 of Fig. 34 represent respectively the shunt inductance and capacitance of wave guide 310 of Fig. 33. The resistances 331 and 332 of Fig. 34 represent the resistive characteristic admittances M of the wave guides 311 and 310 of Fig. 33.

A Y-delta transformation gives us the circuit shown in Fig. 35. We see from Fig. 35 that the wave guides, represented by elements 342, 343, 344 and elements 349, 350 and 351, are effectively interconnected by inductances 345 and 346, each having an impedance $jX_1$, and inductance 347 having an impedance $jX_L$ and capacitance 348 having an impedance $-jX_c$. To calculate the self and transfer admittances of the resonator we assume the right-hand guide shorted and apply a voltage to terminals 353, that is, across the left guide, as shown in Fig. 36. We obtain for the self admittance $$Y_{11} = \frac{i_1}{V} = \frac{-j\left(1+\frac{X_4}{X_1}\right)}{X_1\left(1+2\frac{X_4}{X_1}\right)} \quad (20)$$

Here $i_1$ is the current in inductance 345 of Figs. 35 and 36

$$Y_{21} = \frac{i_2}{V} = \frac{-j\frac{X_4}{X_1}}{X_1\left(1+2\frac{X_4}{X_1}\right)} \quad (21)$$

Here $i_2$ is the current in element 346 of Figs. 35 and 36. In Equations 20 and 21 $X_4$ is the reactance of 347 and 348 in parallel:

$$X_4 = \frac{X_L X_C}{X_C - X_L} \quad (22)$$

We see that $Y_{12}$ and $Y_{21}$ are infinite at a frequency such that $$\frac{X_4}{X_1} = \frac{1}{2} \quad (23)$$

Moreover, when Equation 23 is nearly true, we will have nearly $$Y_{21} = -Y_{11}$$

This indicates that the coupling is of the "contrary" sort, and that to find the difference between the self and transfer admittances we should take $$Y_{11} - (-Y_{21}) = -2j/X_1 \quad (25)$$

In the first place, this is small, as for narrow bands and loose coupling $X_1$ is large. In the second place, it should be possible to tune this out in the input and output guides with a suitable shunt element, so that over the band of even a very broad band filter the difference between transfer admittance and self admittance would be negligible. In fact, putting the resonators λ/4 apart as in Figs. 20 to 23, inclusive, Figs. 25 to 28, inclusive, and Fig. 32, effects substantially this result.

Indeed, it has been found that, for the band widths ordinarily encountered, the shapes of the admittance curves corresponding to the rigorously precise Equations 20 and 21 and the assumed curve of Equation 19 are very nearly identical provided the admittances are appreciable compared with M.

In Fig. 37 a very simple model parallel resonator filter employing three resonators is shown. The loss-versus-frequency characteristic for this filter is shown by curve 410 in Fig. 38.

In Fig. 37 the input wave guide 400, which is closed at end 408, is connected, by three coaxial line or rod type resonators 405, 406, 407, to the output wave guide 401, which is closed at end 409. The resonators are of the general type shown in Fig. 39A described hereinunder and are tuned by tuning screws 404. They are coupled to the wave guides by coupling screws 402. One of these coupling screws, 402′, is shown on the under surface of guide 400, a small portion of guide 400 being shown broken away to disclose screw 402′, in Fig. 37. It is located on the opposite face of the wave guide from the rest of the coupling screws in order to provide "contrary" coupling between the wave guides through resonator 406. Screws 403 are located one-quarter wavelength from screws 402 and serve to tune out the impedance introduced in the wave guides 400 and 401 by the coupling screws 402.

In the filter of Fig. 37, the resonators are resonant transmission lines of the coaxial type coupled to both the input and output wave guides. Fig. 39A shows a cross-section of the filter through one of the resonators. The transmission line resonator has an inner conductor 415 which passes through wave guides 412 and 413, perpendicular to the electric vector and to the direction of propagation, and an outer conductor comprising a tube 411 extending between the wave guides. This line is tuned by means of a tuning screw or stub 414 which adds capacitance at the center of the line. The voltage distribution along the line is indicated in Fig. 39B below the cross-sectional view of Fig. 39A. The curve 419 shows a typical voltage distribution along the conductor 415.

The line is coupled to the input and output wave guides only because two coupling screws 416 and 417 disturb the symmetry of the electric fields in the guides. The coupling of the line to a guide may be increased by making the coupling screws project further into the guide. The sense of the coupling may be reversed by transferring one coupling screw from the top to the bottom of the guide, as exemplified by the relative positions of screws 416 and 417 in Fig. 39 and by the case of screw 402' of Fig. 37 described above.

In the filter of Fig. 37 there are three such resonators, 405, 406 and 407, spaced a half wave apart and hence effectively in parallel. The resonators are an odd number of quarter-wavelengths from the shorted ends of the input and output guides, and hence may be thought of as in parallel across the open-circuited ends of the input and output wave guides.

The filter of Fig. 37 employs coupling means similar to, but preferable to that shown in Fig. 29 from the standpoint of simplicity of design and adjustment. Experience with earlier models has indicated that it is preferable to tune the resonant line symmetrically at the center rather than at one end. With center tuning it was found preferable to add the tube 411 of Fig. 39 between the wave guides, for without it, i. e. with an arrangement similar to Fig. 29, but with centrally located tuning, the tuning screw rendered the short opening between the guides resonant (i. e. it became a tuned iris) and power was transmitted between the two guides by a means not contemplated in the straightforward design. Also, it was found in an early model, that with the coaxial resonators spaced along the guides a quarter-wave, rather than a half-wave apart, there was some further difficulty of adjustment arising from coupling of one line, for example, 411 of Fig. 39, directly to the other coaxial lines rather than through the principal mode wave in the wave guide as had been intended. Thus, tuning a line whose coupling screws were completely withdrawn (for simplicity of design and adjustment such a line is preferably completely uncoupled) affected operation. Extra, unintended couplings make the filter more complex and, in instances such as are described above, more difficult to adjust. There are, of course, instances in which the more complex arrangements will prove more compact and economical by virtue of the additional functions which can be assigned to the "unintended" couplings which merely intrude where simplicity is being sought.

Typically, for operation in the vicinity of 4000 megacycles, the wave guides 400 and 401 of Fig. 37, or 412 and 413 of Fig. 39A, can by way of example, have inside cross-sectional dimensions of seven-eighths inch by one and seven-eighths inches. The tubes connecting the guides, 411 of Fig. 39A, can be three inches long and have an inside diameter of one-half inch. The center conductor 415 of Fig. 39A can be copper strip one-quarter inch by one-thirty-second inch, with its wide dimension extending parallel to the direction of propagation in the wave guides. The coupling screws 416, 417 of Fig. 39A can be located one-half inch from the outside wall of the wave guides and can extend one-quarter inch to three-eighths inch or more into the wave guides. The coupling and tuning screws can be 10–32 brass machine screws about three-quarters inch long. They can preferably, be provided with hexagonal nuts to lock them in place after adjustment.

Three parameters of each resonator can be varied; the tuning (resonant frequency) and the coupling to each guide. As had been predicted, varying these parameters in a single resonator affects the transducer characteristics chiefly at frequencies near the resonant frequency of that resonator. The transducers were quite easy to adjust for either good transmission or good impedance match. A frequency swept oscillator was used and the output of the transducer was viewed on an oscilloscope. It was easy to obtain a flat transmission band. The resonators can be adjusted when all are resonating, or, all but one can be detuned and the active resonator can then be tuned and the coupling adjusted for appropriate broadness of response. The feature of ease of adjustment is particularly valuable in transducers with a large number of resonators.

Because the filter of Fig. 37 was appreciably dissipative or "lossy," is was found to be a little difficult to obtain both a good transmission characteristic and a good input impedance. This can, however, be done more easily if the testing circuits are arranged so that both the reflected and the transmitted power can be viewed simultaneously. This difficulty does not arise in the case of a low-loss or substantially non-dissipative transducer structure.

Experiments were conducted with a branching filter of the type shown in Fig. 40. Here, signals of frequencies $f_1$ and $f_2$ enter the center guide 430, $f_1$ emerges from one of the side guides, 432, while $f_2$ emerges from the other, 431. Wave guide 430 is coupled to wave guide 431 by three resonators 436, 437, 438, proportioned and located as described in connection with Figs. 37 and 39A. These resonators are tuned with screws 439 and coupled with screws 440 and 441. The center screw 441 of each group of three is located on the lower side of wave guide 430 as indicated in Fig. 40. Similarly, wave guide 432 is coupled to wave guide 430 by three resonators 433, 434, 435. These are tuned by means of screws 439 and coupled by screws 440 and 441. By overlapping the transmitting regions of the two filters lightly, a good input impedance match can be obtained over the transition region between the two transmission bands.

While Figs. 1 to 40, inclusive, illustrate, specifically, the use of arrangements of the invention for coupling wave guide transmission lines of the type in which no central conductor is used, the same principles can obviously be used in devising "paralleled resonator" transducers for use with transmission lines of the "coaxial" or other special wave guiding types.

By way of illustration, in Figs. 41A, 41B and 41C, the outer conductor 501, and the inner conductor 502, of an input coaxial transmission line are shown. The outer conductor 503, and the inner conductor 504, of an output coaxial transmission line are also shown. Resonant lines approximately one-half wavelength long, comprising outer conductors 505 and inner conductors 506, couple the input and output coaxial lines at points mutually a half-wavelength apart and an odd number of quarter-wavelengths from the shorted ends of the input and output lines, as shown in Fig. 41A. These resonant lines are tuned by tuning screws 507. They are coupled to the input and output lines by coupling loops

508, shown more clearly in the two longitudinal cross-sectional views 41B and 41C through two of the resonators, respectively. Coupling in two different phases ("plus" and "minus" or "direct" and "contrary") is shown in Fig. 41B and Fig. 41C, respectively. The strength of coupling can be adjusted by adjusting the size of the coupling loops 508.

By way of example, the coaxial transmission lines can be made with an outer conductor having an inside diameter of one-half inch and an inner conductor having an outside diameter of one-eighth inch. The inner conductors can be supported from the outer conductors by means of ceramic or other dielectric washers. The lengths of the lines 505 of Fig. 41 and their spacings along lines 501 and 503 have been described above in terms of wavelengths. The inner and outer conductor diameters for the resonators can be substantially the same as for the coaxial lines between which they are assembled.

In Fig. 42 the admittance curves corresponding to an illustrative form of transducer of the invention having eight resonators coupling an input and an output transmission line is shown. Four of the resonators are "direct" coupled between the transmission lines and have resonances at frequencies 604, 605, 606 and 607, respectively, the admittance curve corresponding to these four resonators being curve 600. The other four resonators are "contrary" coupled between the transmission lines and have resonances at frequencies 608, 609, 610 and 611, respectively, the admittance curve corresponding to these four resonators being curve 602.

As curve 600 has no critical frequency (zero or pole) at frequency 609 and curve 602 has no critical frequency (zero or pole) at frequency 607, frequencies 609 and 607 are the cut-off frequencies and the structure is a band pass wave filter passing all frequencies between frequencies 609 and 607. That this is a transmission band is shown by the fact that throughout this band the resonances 625 and 626, and antiresonances 605 and 606, of curve 600 correspond in frequency with the antiresonances 610 and 611, and resonances 629 and 630, of curve 602, respectively. In the attenuating ranges, i. e. above frequency 607 and below frequency 609, the converse arrangement of critical frequencies obtains i. e. antiresonance 604 and resonances 624 and 627 of curve 600, correspond in frequency with antiresonance 608 and resonances 628 and 631, of curve 602, respectively. From analogy with conventional low-frequency lumped-element lattice type wave filter theory it is apparent that "peaks" or maxima of attenuation will occur at frequencies 604, 624 and 627 of curve 600 (corresponding to frequencies 608, 628 and 631 of curve 602).

Matched pairs of critical frequencies in the attenuating regions, such as 604, 608; 624, 628; and 627, 631; of Fig. 42, can be positioned near the cut-off frequencies such as frequencies 609 and 607 of Fig. 42 to increase the "steepness" of the attenuation curve, i. e. the sharpness of the transition from transmission to large attenuation, near the edges or sides of the transmitted band. Other matched pairs can be positioned at frequencies lying in adjacent frequency bands or transmitting channels to provide greatly increased attenuation in order to minimize crosstalk or bands of a multichannel communication system.

Stated in other words, the principles of the invention make entirely practicable the direct application to the design of guided wave frequency range wave filters, employing wave guide (hollow cavity) and/or coaxial line type resonators, the time honored wave filter design practices, based upon the teachings of Bode, Dietzold and others, for low frequency "lumped-element" lattice and equivalent types of wave filters.

High-pass or low-pass wave filter characteristics can, obviously, be realized with paralleled resonator filters of the invention by merely positioning the resonances so that one admittance curve (either that corresponding to the "directly" coupled or the "contrarily" coupled resonators) has a critical frequency at the desired cutoff frequency and so that, in the desired attenuating range the critical frequencies of the two admittance curves are coincident in frequency and alike in character and in the desired transmitting range the critical frequencies of the two admittance curves are coincident in frequency and unlike in character, i. e. each resonance of one curve, is paired with (or occurs at the frequency of) an anti-resonance of the other curve and vice-versa. It should be noted that it is not necessary that the admittance (or impedance) curves have any critical frequencies (zeros or poles) in the attenuating regions. Without critical frequencies in the attenuating regions, however, the attenuation will increase relatively gradually. It is also a matter of choice, to be determined largely by the phase characteristics desired throughout the transmitting band, whether any critical frequencies (zeros or poles) are to be positioned within the transmitted band. Fig. 9, described in detail above, illustrates the use of a large number of critical frequencies within the transmission band and it is pointed out that a linear phase characteristic can be obtained by spacing the critical frequencies at regular intervals throughout the transmitting band. Conversely almost any non-linear phase characteristic such, for example, as might be required for equalizing or compensating for non-linear phase shifts introduced by other apparatus in the system, can be realized by use of an appropriate number of critical frequencies positioned judiciously throughout the transmitted band precisely in accordance with the teachings of Bode, Dietzold and others for low-frequency lumped-element structures.

As a further illustrative example, appropriate admittance curves for a very simple paralleled resonator wave filter of the invention are shown in Fig. 43. Curve 700 can be realized, of course, by two resonators coupled in like sense, either "directly" or "contrarily," the two resonators being resonant at frequencies 704 and 706 (antiresonances of the admittance curve). Curve 702 can be realized, of course, by a single resonator which is, obviously, coupled in the opposite sense from the first mentioned two resonators (i. e. "contrary" if they are "direct" coupled or vice-versa), the single resonator being resonant at frequency 708 which is coincident in frequency with the resonance 709 of admittance curve 700. Frequencies 704 and 706 will then be the cut-off frequencies and the paralleled resonator filter will transmit or pass all frequencies lying between these two frequencies and attenuate all other frequencies. The physical structure of the wave filter, corresponding to the curves of Fig. 43, can be any of the many structures illustrated in the drawings and described in detail above but, of course, only three resonators are required so that any additional resonators can be omitted.

Such a simple filter will suffice where the discrimination required between adjacent frequency channels of a communication system is not very large. This condition obtains usually where the power levels of adjacent frequency channels are substantially the same.

Numerous other arrangements and combinations of the features of the invention and their equivalents will readily occur to those skilled in the art. The above-described embodiments are merely illustrative of the inventive principles involved.

What is claimed is:

1. A transducer comprising a plurality of guided wave frequency range cavity resonators, each of said resonators having a resonant frequency which differs from several of the resonant frequencies of the remainder of said resonators, two sections of guided wave frequency range transmission line and two coupling arrangements associated with each resonator, one coupling arrangement in the case of each resonator coupling one point of its associated resonator to one section of wave guide, the other coupling arrangement coupling an opposing point of said resonator to the other section of wave guide, one end of each of said sections of transmission line being short-circuited, the coupling points of said resonators to said transmission lines being spaced from said short circuited ends and from each other by discrete distances in wavelengths of the median frequency of the energy to be transmitted through said resonators.

2. The transducer of claim 1 in which said resonators are spaced along said two sections of transmission line at half wavelength intervals between successive coupling points.

3. The transducer of claim 1 in which said resonators are spaced along said two sections of transmission line at quarter wavelength intervals between successive coupling points.

4. A microwave transducer comprising two sections of microwave transmission line positioned in parallel relation, a plurality of microwave cavity resonator structures each of said resonator structures having a resonant frequency which differs from several of the resonant frequencies of the remainder of said resonator structures, said resonator structures extending from one section of transmission line to the other and a coupling arrangement at each end of each resonator structure, said coupling arrangements coupling one end of each resonator to one section of transmission line and the other end of each resonator to the other section of transmission line, one end of each of said sections of transmission line being short-circuited, the coupling points of said resonators to said transmission lines being spaced from said short circuited ends and from each other by discrete distances in wavelengths of the median frequency of the energy to be transmitted through said resonators.

5. The arrangement of claim 4 in which a first group of said resonators provide "direct" coupling between said transmission lines and a second group of said resonators provide "contrary" coupling between said lines.

6. The arrangement of claim 4 in which the resonators, reckoned in order of successively increasing frequency, alternately provide "direct" and "contrary" coupling between said transmission line sections.

7. A microwave transducer comprising a pair of wave guides, each of said wave guides being short-circuited at one end, a plurality of microwave cavity resonators, each of said resonators having a resonant frequency which differs from several of the resonant frequencies of the remainder of said resonators, a like plurality of pairs of coupling arrangements, one pair of said coupling arrangements being associated with each of said resonators, one coupling arrangement of each pair being arranged to electrically couple its associated resonator to one of said wave guides, the other coupling arrangement of each pair being arranged to electrically couple its associated resonator to the other of said wave guides, one end of each of said wave guides being short-circuited, the coupling points of said resonators to said wave guides being spaced from said short circuited ends and from each other by discrete distances in wavelengths of the median frequency of the energy to be transmitted through said resonators.

8. The transducer of claim 7 in which all resonators are coupled to points along both said wave guides, which points are spaced from the shorted ends of said wave guides at odd numbers of quarter wavelengths of the median frequencies of the frequency bands transmitted by said resonators, respectively.

9. The transducer of claim 7 in which all resonators are coupled to points along both said wave guides which points are spaced from the shorted ends of said wave guides at odd numbers of eighth wavelengths of the median frequencies of the frequency bands transmitted by said resonators, respectively.

10. A guided wave frequency range transducer comprising two like sections of wave guide transmission line of rectangular cross-section, one cross-sectional dimension of said wave guides being greater than the other, each wave guide section being short-circuited at one end, a plurality of guided wave frequency range cavity resonators, each of said resonators having a resonant frequency which differs from several of the resonant frequencies of the remainder of said resonators, and a like plurality of pairs of coupling arrangements, each pair of coupling arrangements being associated with one of said resonators only, one coupling arrangement of each pair electrically coupling its associated resonator to one of said wave guide sections, the other coupling arrangement of each pair coupling its associated resonator to the other of said wave guide sections, the points of coupling to said wave guides being spaced along said wave guide sections from the respective shorted ends of said sections at odd numbers of quarter wavelengths of the median frequencies of the frequency bands transmitted by each said resonator, respectively, said couplings to said wave guide sections being effected through the smaller cross-sectional dimensions of said wave guide sections.

11. A guided wave frequency range transducer comprising two like sections of wave guide transmission line of rectangular cross-section, one cross-sectional dimension of said wave guides being greater than the other, each wave guide section being short-circuited at one end, a plurality of guided wave frequency range cavity resonators, each of said resonators having a resonant frequency which differs from several of the resonant frequencies of the remainder of said resonators, and a like plurality of pairs of coupling arrangements, each pair of coupling arrangements being associated with one of said resonators only, one coupling arrangement of each pair electrically coupling its associated resonator to one of said wave guide sections, the other coupling arrangement of each pair coupling its associated resonator to the other of said wave guide sections, the points of coupling to said wave guides being spaced along said wave guide sections from the respective shorted ends of said sections at discrete distances in wavelengths of the median frequencies of the frequency bands transmitted by each said resonator, respectively, said couplings to said wave guide sections being effected through the larger cross-sectional dimensions of said wave guide sections.

12. A guided wave frequency range transducer comprising two like sections of wave guide transmission line of rectangular cross-section, one cross-sectional dimension of said wave guides being greater than the other, each wave guide section being short-circuited at one end, a plurality of guided wave frequency range cavity resonators, each of said resonators having a resonant frequency which differs from several of the resonant frequencies of the remainder of said resonators, and a like plurality of pairs of coupling arrangements, each pair of coupling arrangements being associated with one of said resonators only, one coupling arrangement of each pair electrically coupling its associated resonator to one of said wave guide sections, the other coupling arrangement of each pair coupling its associated resonator to the other of said wave guide sections, the points of coupling to said wave guides being spaced along said wave guide sections from the respective shorted ends of said sections at discrete distances in wavelengths of the median frequencies of the frequency bands transmitted by each said resonator respectively, said couplings to said wave guide sections being effected through the smaller cross-sectional dimensions of said wave guide sections.

13. A guided wave frequency range transducer comprising two like sections of wave guide transmission line of rectangular cross-section, one cross-sectional dimension of said wave guides being greater than the other, each wave guide section being short-circuited at one end, a plurality of guided wave frequency range cavity resonators, each of said resonators having a resonant frequency which differs from several of the resonant frequencies of the remainder of said resonators, and a like plurality of pairs of coupling arrangements, each pair of coupling arrangements being associated with one of said resonators only, one coupling arrangement of each pair electrically coupling its associated resonator to one of said wave guide sections, the other coupling arrangement of each pair coupling its associated resonator to the other of said wave guide sections, the points of coupling to said wave guides being spaced along said wave guide sections from the respective shorted ends of said sections at odd numbers of eighth wavelengths of the median frequencies of the frequency bands transmitted by each said resonator, respectively, said couplings to said wave guide sections being effected through the larger cross-sectional dimensions of said wave guide sections.

14. A guided wave frequency range distributing system comprising a plurality of wave guide sections each wave guide section being short-circuited at one end, a like plurality less one, of groups of guided wave frequency range cavity resonators, each resonator of each of said groups having a resonant frequency which differs from the resonant frequencies of several of the remainder of the resonators of its group, each group comprising a plurality of resonators, one of said wave guide sections being coupled to each of the other wave guide sections, by a different one of said groups of resonators, each group of said resonators passing frequencies within a different frequency band from those passed by any of the other groups of resonators.

15. A guided wave frequency range distributing system comprising first, second and third sections of wave guide, each section being short-circuited at one end, a pair of groups of guided wave frequency range cavity resonators, each resonator of each group having a resonant frequency which differs from several of the resonant frequencies of the remainder of the resonators in its group, the resonators of each group being resonant at frequencies within separate but nearly adjacent frequency bands, one of said groups of resonators coupling said first and said second wave guide sections, the other of said groups of resonators coupling said first and said third wave guide sections, and an impedance corrective resonator, resonant at a frequency approximately median between the frequency bands of said two groups of resonators, said impedance corrective resonator being coupled to said first wave guide section.

16. A guided wave frequency range transducer, comprising a plurality of guided wave frequency range cavity resonators tuned to a like plurality of resonant frequencies, each of said frequencies differing from several of the remainder of said frequencies, a pair of guided wave frequency range transmission lines, each of said resonators being coupled to both of said transmission lines so as to transmit frequencies in the vicinity of its resonant frequency between said transmission lines, one portion of said plurality of resonators being coupled to said lines to form "direct" couplings between said lines, another portion of said resonators being coupled to said lines to form "contrary" couplings between said lines, the resonant frequencies, or zeros, of each portion of said resonators being positioned to coincide with the antiresonant frequencies or poles of the other of said portions of said resonators.

17. A transducer for use at very high frequencies, ultra-high frequencies or super-high frequencies comprising a plurality of cavity resonators having a like plurality of resonant frequencies within the frequency region employed, each of said resonant frequencies differing from several of the remainder of said frequencies, and a pair of transmission lines for said frequency region, each of said resonators providing an individual transmission path between said pair of transmission lines at frequencies in the vicinity of the resonant frequency of said resonator, a first portion of said resonators providing an electrically direct coupling between said transmission lines and a second portion of said resonators providing an electrically contrary coupling between said transmission lines, a portion of the resonant frequencies, or zeros, of each of said group of resonators being coincident in frequency with the antiresonant frequencies, or poles, of the other of said group of resonators.

18. A guided wave frequency range transducer comprising a plurality of guided wave frequency range electrical cavity resonators, each of said resonators having a resonant frequency which differs from the resonant frequencies of several of the remainder of said resonators, two sections of guided wave frequency range transmission line and a pair of electrical coupling means associated with each of said resonators and coupling one point of the associated resonator to one of said transmission lines and another point of the associated resonator to the other of said transmission lines, the coupling points for successive resonators being distributed along each transmission line at intervals of at least one quarter wavelength of the median frequency of the range of frequencies being transmitted through each resonator.

19. A transducer comprising an input section of wave guide closed at one end, an output section of wave guide closed at one end, said sections of wave guide being arranged with their longitudinal axes substantially parallel and their closed ends in a common plane, a plurality of substantially closed resonant cavities, each cavity being resonant at a single frequency within or adjacent to a band or channel of frequencies to be transmitted from said first to said second section of wave guide, the resonant frequency of each cavity differing from the resonant frequencies of several of the other cavities, each of said cavities comprising a short section of wave guide extending from one to the other of said first and second-mentioned sections of wave guide, each of said cavities being electrically coupled at one point to said input section of wave guide and, at a second point, spaced from said first point, being electrically coupled to said output section of wave guide, the coupling points between said resonators and said sections of wave guide being at least ⅛ wavelength of the median frequency transmitted by said resonators, respectively, from the closed ends of said sections of wave guide, respectively.

20. The structure of claim 19, the points of coupling of said cavity resonators to said input and output wave guide sections being spaced an odd number of quarter wavelengths from the closed ends of said input and output wave guide sections, and an odd number of half wavelengths from adjacent coupling points.

21. The structure of claim 19, the points of coupling of said cavity resonators to said input and output wave guide sections being spaced an odd number of eighth wavelengths from the closed ends of said input and output wave guide sections and an odd number of quarter wavelengths from adjacent coupling points.

22. The structure of claim 19, a portion only of said resonators being coupled to said input and output wave guide sections by coupling means which introduce a phase change differing by 180° from the phase change introduced by the coupling means of the remainder of said resonators.

23. The structure of claim 19, the coupling means of all said resonators to said input and output wave guide sections introducing substantially identical phase changes.

24. The structure of claim 19, the said input and output sections of wave guides being of rectangular cross-section, one cross-sectional dimension of said wave guide sections being larger than the other, the resonators being coupled into the said input and output wave guide sections through sides thereof having the larger cross-sectional dimension.

25. A transducer comprising an input section of wave guide and a plurality of output sections of wave guide, all of said sections having their longitudinal axes substantially parallel and being closed at one end, the closed ends of said sections lying in one or another of a number of parallel planes, said parallel planes being separated by an odd number of half wavelengths, a plurality of cavity resonators coupling each of said plurality of output sections of wave guide with said input section of wave guide, each of said resonators being tuned to resonance at a different frequency within the band of frequencies to be transmitted to its associated output wave guide section.

26. A transducer comprising a pair of guided wave frequency range transmission line sections, each section being short-circuited at one end, a first plurality of guided wave frequency range cavity resonators each resonant at a different one of a first plurality of frequencies, said first plurality of resonators each being coupled between said transmission lines in "direct" phase relation, a second plurality of guided wave frequency range resonators each resonant at a different one of a second plurality of frequencies, said second plurality of resonators each being coupled between said transmission lines in "contrary" phase relation, a portion of the frequencies of said second plurality of frequencies being coincident with a like portion of the frequencies of said first plurality of frequencies.

27. The transducer of claim 26, the coupling points of said resonators to said transmission line sections being an odd number of quarter wavelengths from the short-circuited ends of said transmission line sections and an odd number of half wavelengths from adjacent coupling points.

28. A transducer comprising a first section of wave guide short-circuited at one end, a second section of wave guide short-circuited at one end, and a plurality of rectangularly-shaped resonant cavity type resonators, each of said resonators having a resonant frequency which differs from the resonant frequencies of several of the remainder of said resonators, said resonators being assembled between said wave guide sections, each cavity being coupled by an iris or aperture to each of said wave guide sections.

29. The transducer of claim 28 in which the coupling points of the respective resonators are spaced along the wave guide sections at odd numbers of eighth wavelengths from the closed ends of said wave guide sections and at odd numbers of quarter wavelengths between successive coupling points.

30. A transducer comprising a first section of coaxial type transmission line shorted at one end, a second section of coaxial type transmission line shorted at one end and a plurality of coaxial type transmission line cavity resonators each resonator being tuned to a resonant frequency, the resonant frequency of each resonator differing from several of the resonant frequencies of the remainder of said resonators, said resonators being assembled between said transmission line sections, said resonators being coupled at opposite ends to said first and said second sections of transmission line, respectively.

31. The transducer of claim 30 in which the resonators are coupled to said transmission line sections at distances of an odd number of quarter wavelengths from the shorted ends of said sections, each of the coupling points being separated from immediately adjacent coupling points by an odd number of half wavelengths.

32. The transducer of claim 30 in which a portion of the resonators provide "direct" coupling between said transmission line sections and the remainder of the resonators provide "contrary" coupling.

33. A guided wave frequency range transducer comprising a first section of guided wave frequency range transmission line, a second section of guided wave frequency range transmission line, a first plurality of guided wave frequency range cavity resonators and a second plurality of guided wave frequency range cavity resonators, all of said resonators being coupled at one end to said first section of transmission line and at the other end to said second section of transmission line, said first plurality of resonators constituting "direct" couplings between said first and second transmission line sections, said second plurality of resonators constituting "contrary" couplings between said first and second transmission line sections, the frequencies of resonance of said first plurality of resonators differing from each other and corresponding in part with frequencies of resonance of said second plurality of resonators and in part with frequencies of antiresonance of said second plurality of resonators.

34. A parallel resonator guided wave frequency range transducer comprising two sections of guided wave frequency range transmission line coupled by each of a plurality of guided wave frequency range cavity resonators, a first group of said resonators having resonant frequencies no two of which are coincident in frequency, said resonators being "directly" coupled and a second group of said resonators being "contrarily" coupled, the resonant frequencies of a portion of each group of resonators being coincident in frequency with the antiresonances occurring between the resonant frequencies of a like portion of the resonators of the other group.

35. A parallel resonator guided wave frequency range transducer comprising two sections of guided wave frequency range transmission line coupled by each of a plurality of guided wave frequency range cavity resonators, a first group of said resonators having resonant frequencies no two of which are coincident in frequency, said resonators being "directly" coupled and a second group of said resonators being "contrarily" coupled, the resonant frequencies of a portion of each group of resonators being coincident in frequency with the resonant frequencies of a like portion of the resonators of the other group.

36. A parallel resonator guided wave frequency range transducer comprising two sections of guided wave frequency range transmission line coupled by each of a plurality of guided wave frequency range cavity resonators, a first group of said resonators having resonant frequencies no two of which are coincident in frequency, said resonators being "directly" coupled and a second group of said resonators being "contrarily" coupled, the resonant frequency of one resonator of one of said groups being adjusted to a frequency at which no resonant or antiresonant frequency of said other group of resonators is adjusted.

37. A parallel resonator guided wave frequency range transducer comprising two sections of guided wave frequency range transmission line coupled by each of a plurality of guided wave frequency range cavity resonators, a first group of said resonators having resonant frequencies no two of which are coincident in frequency, said resonators being "directly" coupled and a second group of said resonators being "contrarily" coupled, the resonant frequencies of a first portion of one of said groups of resonators being coincident in frequency with the resonant frequencies of a like portion of the resonators of said other group, and the resonant frequencies of a second portion of said one of said groups of resonators being coincident in frequency with antiresonant frequencies of said other group of resonators.

38. A transducer comprising two sections of wave guide transmission line, and three resonant cavities, each cavity coupling said two sections together, two of said cavities being "directly" coupled between said sections, the third of said cavities being "contrarily" coupled between said sections, the resonant frequencies of said three cavities being displaced from each other in frequency and positioned within a predetermined frequency region.

39. A transducer comprising two sections of guided wave frequency range transmission line and a plurality of guided wave frequency range cavity resonators, each resonator being coupled between said sections, a first portion of said resonators being "directly" coupled, and having resonant frequencies no two of which are coincident in frequency, a second like portion of said resonators being "contrarily" coupled, the resonant frequencies of said first portion of said resonators being positioned to be coincident in frequency with a like number of antiresonance frequencies of said second portion of said resonators, the spacings between adjacent paired critical frequencies of said two portions being adjusted in accordance with a predetermined arrangement imparting a particular phase characteristic throughout the frequency region within which said paired critical frequencies are located.

40. A transducer comprising two sections of coaxial transmission line, and a plurality of coaxial line cavity resonators, each resonator being coupled between said two sections, the resonant frequencies of all said resonators being adjusted to different frequencies within a predetermined range of frequencies.

41. The transducer of claim 40, a first portion of said resonators being "directly" coupled and a second portion of said resonators being "contrarily" coupled.

JOHN R. PIERCE.

REFERENCES CITED

The following references are of record in the file of this patent:

UNITED STATES PATENTS

| Number | Name | Date |
|---|---|---|
| 2,153,728 | Southworth | Apr. 11, 1939 |
| 2,349,942 | Dallenbach | May 30, 1944 |
| 2,423,390 | Korman | July 1, 1947 |
| 2,432,093 | Fox | Dec. 9, 1947 |
| 2,458,556 | Bowen | Jan. 11, 1949 |
| 2,473,443 | Rieke | June 14, 1949 |

FOREIGN PATENTS

| Number | Country | Date |
|---|---|---|
| 545,936 | Great Britain | June 18, 1942 |

OTHER REFERENCES

Mumford, "Directional Coupler," I. R. E. Proceedings, vol. 35, No. 2, February 1947, pages 160–165.

Montgomery, "Technique of Microwave Measurements," McGraw Hill, New York, pages 866–873, February 1947.